United States Patent
Seok et al.

(10) Patent No.: US 11,889,435 B2
(45) Date of Patent: Jan. 30, 2024

(54) ENHANCED HIGH-THROUGHPUT SYNCHRONOUS AND CONSTRAINED MULTI-LINK TRANSMISSIONS IN WLAN

(71) Applicant: MediaTek Singapore Pte. Ltd., Singapore (SG)

(72) Inventors: Yongho Seok, San Jose, CA (US); Jianhan Liu, San Jose, CA (US); James Chih-Shi Yee, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 259 days.

(21) Appl. No.: 16/918,282

(22) Filed: Jul. 1, 2020

(65) Prior Publication Data
US 2021/0014811 A1    Jan. 14, 2021

Related U.S. Application Data

(60) Provisional application No. 62/888,015, filed on Aug. 16, 2019, provisional application No. 62/873,364, filed on Jul. 12, 2019.

(51) Int. Cl.
H04W 56/00 (2009.01)
H04W 76/15 (2018.01)
(Continued)

(52) U.S. Cl.
CPC ....... *H04W 56/0005* (2013.01); *H04W 72/23* (2023.01); *H04W 74/0816* (2013.01); *H04W 76/15* (2018.02); *H04W 84/12* (2013.01)

(58) Field of Classification Search
None
See application file for complete search history.

(56) References Cited

U.S. PATENT DOCUMENTS

2016/0113009 A1\* 4/2016 Seok ............... H04W 74/006
                                                          370/329
2016/0330708 A1  11/2016 Seok
(Continued)

FOREIGN PATENT DOCUMENTS

CN  1744550 A1  12/2006
EP  3716722 A1   9/2020
(Continued)

OTHER PUBLICATIONS

Taiwan Intellectual Property Office, Office Action for Taiwan Patent Application No. 109122737, dated May 10, 2021.
(Continued)

*Primary Examiner* — Mariela Vidal Carpio
(74) *Attorney, Agent, or Firm* — Han IP PLLC; Andy M. Han

(57) ABSTRACT

A first apparatus communicates with a second apparatus via a first link in a first frequency band and via a second link in a second frequency band different than the first frequency band by performing operations. For example, the first apparatus performs an independent enhanced distributed channel access (EDCA) on each of the first link and the second link. Then, the first apparatus obtains a transmit opportunity (TXOP). Next, the first apparatus synchronizes a starting time and/or an ending time of a transmission and a reception on the first link and the second link to avoid causing an in-device coexistence (IDC) interference due to the transmission and the reception occurring simultaneously. Alternatively, the first apparatus refrains from transmitting and receiving on the first link and the second link simultaneously to avoid causing the IDC interference.

16 Claims, 18 Drawing Sheets

(51) Int. Cl.
*H04W 74/08* (2009.01)
*H04W 72/23* (2023.01)
*H04W 84/12* (2009.01)

(56) References Cited

U.S. PATENT DOCUMENTS

| | | | |
|---|---|---|---|
| 2019/0029024 A1* | 1/2019 | Ryu | H04W 72/541 |
| 2019/0082463 A1* | 3/2019 | Patil | H04W 74/0808 |
| 2019/0288763 A1* | 9/2019 | Oteri | H04B 7/0695 |
| 2020/0037288 A1* | 1/2020 | Huang | H04L 5/0055 |
| 2020/0045656 A1* | 2/2020 | Verma | H04L 69/28 |
| 2020/0107393 A1* | 4/2020 | Chu | H04L 1/0003 |
| 2020/0162135 A1* | 5/2020 | Sun | H04B 17/318 |
| 2020/0267741 A1* | 8/2020 | Kwon | H04L 5/0037 |
| 2020/0305164 A1* | 9/2020 | Yang | H04W 4/00 |
| 2021/0315036 A1* | 10/2021 | Jang | H04L 1/1887 |
| 2021/0329698 A1* | 10/2021 | Jang | H04W 80/02 |
| 2021/0368491 A1* | 11/2021 | Song | H04W 72/0406 |
| 2021/0409958 A1* | 12/2021 | Huang | H04L 25/0224 |
| 2022/0132611 A1* | 4/2022 | Fang | H04W 52/0229 |
| 2022/0159718 A1* | 5/2022 | Fang | H04W 74/085 |
| 2022/0167444 A1* | 5/2022 | Jang | H04L 65/40 |

FOREIGN PATENT DOCUMENTS

| | | |
|---|---|---|
| KR | 1020080007452 A | 1/2008 |
| WO | WO 2014134954 A1 | 9/2014 |

OTHER PUBLICATIONS

Eurpean Patent Office, Communication and Extended Search Report regarding European Patent Application No. 20184683.9, dated Oct. 22, 2020.

Yongho Seok et al., EHT Multi-link Operation, IEEE 802.11-19/0731r0, May 16, 2019, pp. 1-17.

Yunbo Li et al., Channel Access in Multi-band operation, IEEE 802.11-19/1116r0, Jul. 10, 2019, pp. 1-16.

* cited by examiner

1700

COMMUNICATE, BY A PROCESSOR OF A FIRST APPARATUS, WITH A SECOND APPARATUS VIA A FIRST LINK IN A FIRST FREQUENCY BAND AND VIA A SECOND LINK IN A SECOND FREQUENCY BAND DIFFERENT THAN THE FIRST FREQUENCY BAND
1710

PERFORM AN INDEPENDENT ENHANCED DISTRIBUTED CHANNEL ACCESS (EDCA) ON EACH OF THE FIRST LINK AND THE SECOND LINK
1712

OBTAIN A TRANSMIT OPPORTUNITY (TXOP)
1714

SYNCHRONIZE A STARTING TIME AND AN ENDING TIME OF A TRANSMISSION AND A RECEPTION ON THE FIRST LINK AND THE SECOND LINK TO AVOID CAUSING AN IN-DEVICE COEXISTENCE (IDC) INTERFERENCE DUE TO THE TRANSMISSION AND THE RECEPTION OCCURRING SIMULTANEOUSLY
1716

```
COMMUNICATE, BY A PROCESSOR OF A FIRST APPARATUS, WITH A
SECOND APPARATUS VIA A FIRST LINK IN A FIRST FREQUENCY BAND
AND VIA A SECOND LINK IN A SECOND FREQUENCY BAND DIFFERENT
                THAN THE FIRST FREQUENCY BAND
                           1810
```

PERFORM AN INDEPENDENT ENHANCED DISTRIBUTED CHANNEL ACCESS (EDCA) ON EACH OF THE FIRST LINK AND THE SECOND LINK
1812

OBTAIN A TRANSMIT OPPORTUNITY (TXOP)
1814

REFRAN FROM TRANSMITTING AND RECEIVING ON THE FIRST LINK AND THE SECOND LINK SIMULTANEOUSLY TO AVOID CAUSING AN IN-DEVICE COEXISTENCE (IDC) INTERFERENCE
1816

FIG. 18

ENHANCED HIGH-THROUGHPUT SYNCHRONOUS AND CONSTRAINED MULTI-LINK TRANSMISSIONS IN WLAN

CROSS REFERENCE TO RELATED PATENT APPLICATION

The present disclosure is part of a non-provisional patent application claiming the priority benefit of U.S. Provisional Patent Application Nos. 62/873,364 and 62/888,015, filed on 12 Jul. 2019 and 16 Aug. 2019, respectively, the contents of which being incorporated by reference in their entirety.

TECHNICAL FIELD

The present disclosure is generally related to wireless communications and, more particularly, to enhanced high-throughput (EHT) synchronous and constrained multi-link transmissions in wireless local area networks (WLANs).

BACKGROUND

Unless otherwise indicated herein, approaches described in this section are not prior art to the claims listed below and are not admitted as prior art by inclusion in this section.

A station (STA) in a WLAN can perform an independent Enhanced Distributed Channel Access (EDCA) channel access on each link with its own EDCA parameters such as minimum contention window ($CW_{min}$), maximum contention window ($CW_{max}$), arbitration inter-frame space (AIFS), contention window (CW), and retry counter. After obtaining a transmit opportunity (TXOP), the STA can initiate a transmission of a frame exchange sequence. Each Medium Access Control (MAC) Protocol Data Unit (MPDU) can be independently encoded into one of a plurality of frequency segments.

When the STA simultaneously transmits and receives frames, an in-device coexistence (IDC) interference may exist. When simultaneous transmit and receive (Tx & Rx) operation occurs between 2.4-GHz band and 5-GHz band, the resultant IDC interference tends to be negligible. However, when simultaneous Tx & Rx operation occurs between 5-GHz band and 6-GHz band, the resultant IDC interference may vary and negatively impact throughput depending on the frequency separation of the operating channels. Therefore, there is a need for a solution for EHT synchronous and constrained multi-link transmissions in WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT synchronous and constrained multi-link transmissions in WLANs. Under various proposed schemes in accordance with the present disclosure, the aforementioned issues of IDC interference may be avoided or otherwise alleviated.

In one aspect, a method may involve a processor of a first apparatus communicating with a second apparatus via a first link in a first frequency band and via a second link in a second frequency band different than the first frequency band by performing operations. For instance, the method may involve the processor performing an independent EDCA on each of the first link and the second link. The method may also involve the processor obtaining a TXOP. The method may further involve the processor synchronizing either or both of a starting time and an ending time of a transmission and a reception on the first link and the second link to avoid causing an IDC interference due to the transmission and the reception occurring simultaneously.

In another aspect, a method may involve a processor of a first apparatus communicating with a second apparatus via a first link in a first frequency band and via a second link in a second frequency band different than the first frequency band by performing operations. For instance, the method may involve the processor performing an independent EDCA on each of the first link and the second link. The method may also involve the processor obtaining a TXOP. The method may further involve the processor refraining from transmitting and receiving on the first link and the second link simultaneously to avoid causing an IDC interference.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 17 is a flowchart of an example process in accordance with an implementation of the present disclosure.

FIG. 18 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT synchronous and constrained multi-link transmissions in WLANs. According to the present disclosure, a number of possible solutions may be implemented separately or jointly. That is, although these possible solutions may be described below separately, two or more of these possible solutions may be implemented in one combination or another.

Figure 1:
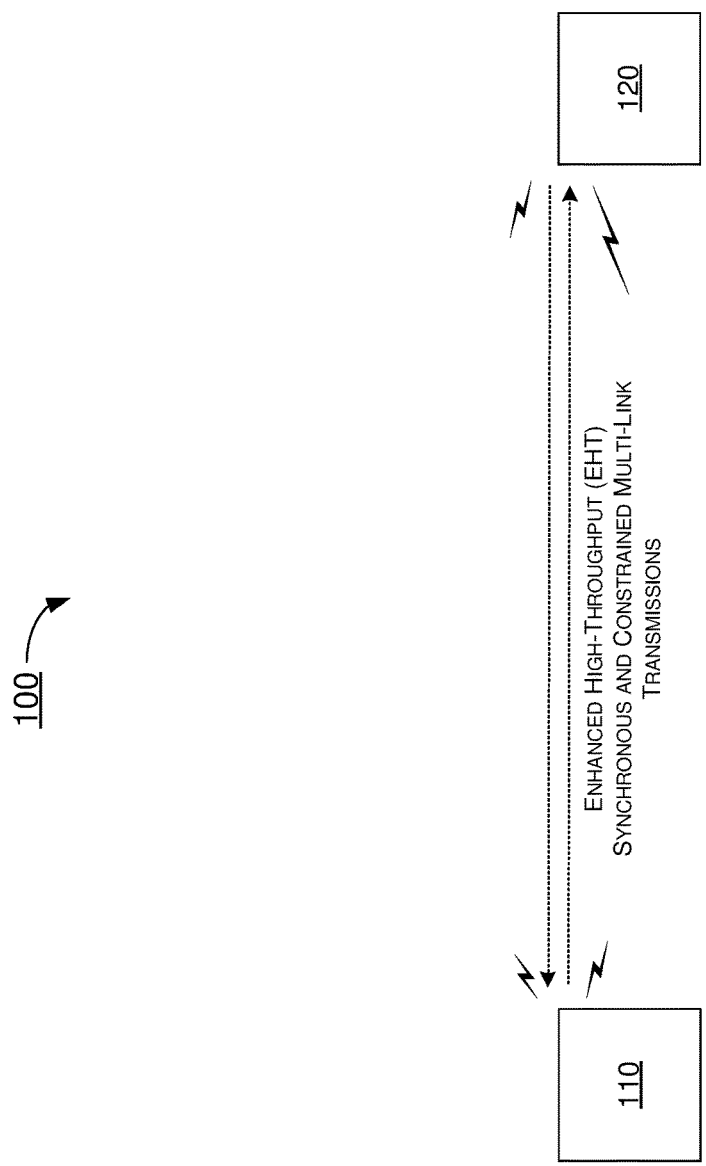
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 15 illustrate examples of implementation of various proposed schemes in network environment 100 in accordance with the present disclosure. The following description of various proposed schemes is provided with reference to FIG. 1~FIG. 15.

Referring to FIG. 1, network environment 100 may involve a communication entity 110 and a communication entity 120 communicating wirelessly in a WLAN in accordance with one or more Institute of Electrical and Electronics Engineers (IEEE) 802.11 standards. For instance, communication entity 110 may be a STA (e.g., a sending STA) or an access point (AP) and communication entity 120 may be a peer STA, a soliciting STA or an AP. Under various proposed schemes in accordance with the present disclosure, communication entity 110 and communication entity 120 may be configured to perform EHT synchronous and constrained multi-link transmissions according to various proposed schemes described herein.

Figure 2:
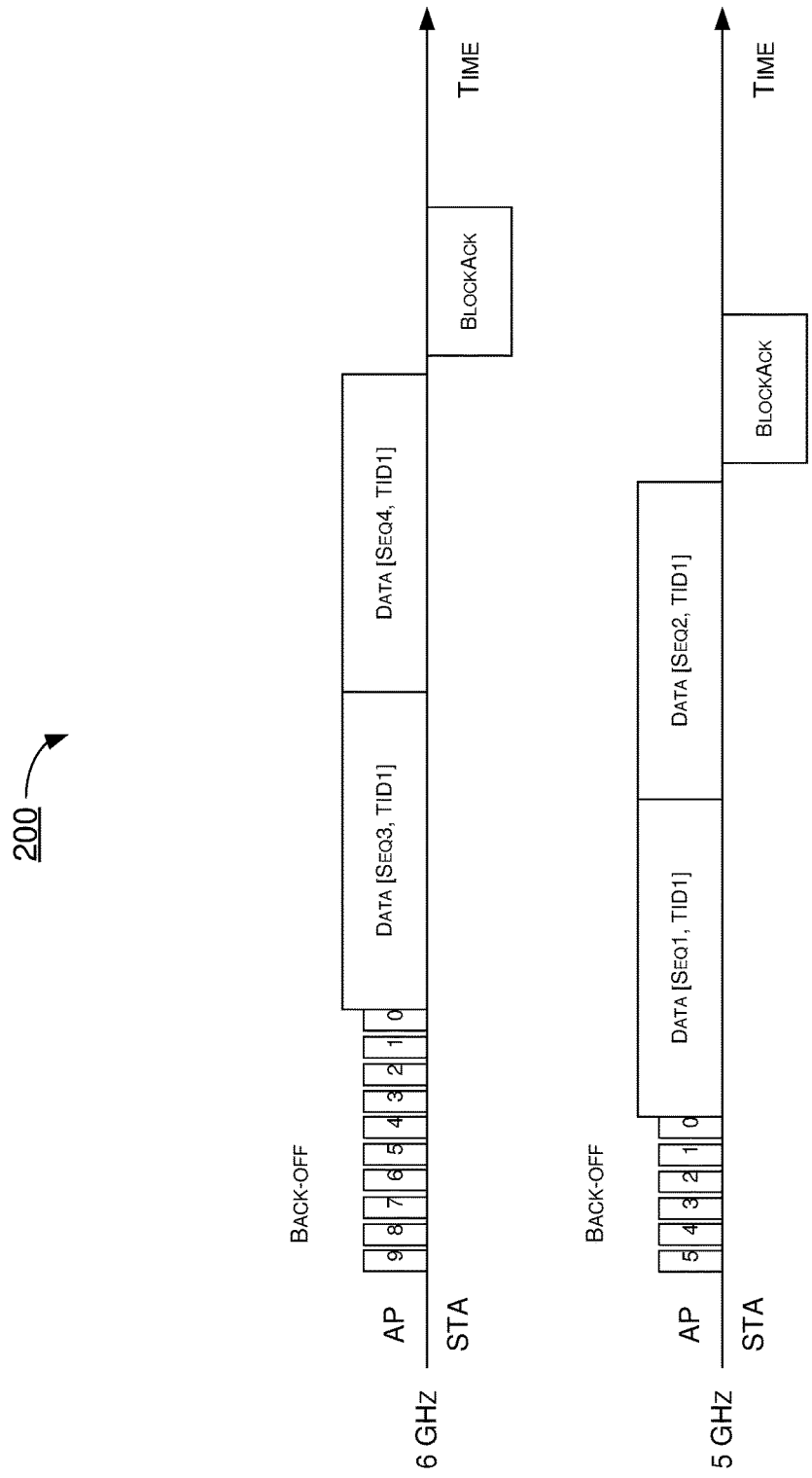
FIG. 2 is a diagram of an example scheme.

FIG. 2 illustrates an example scenario 200 of asynchronous multi-link transmissions. Referring to FIG. 2, in scenario 200, communication entity 110, as a STA, may perform an independent EDCA channel access on each link with its own EDCA parameters (e.g., $CW_{min}$, $CW_{max}$, AIFS, CW and retry counter). After obtaining a TXOP, communication entity 110 may initiate the transmission of a frame exchange sequence. Each MPDU may be independently encoded into one of a plurality of frequency segments.

Figure 3:
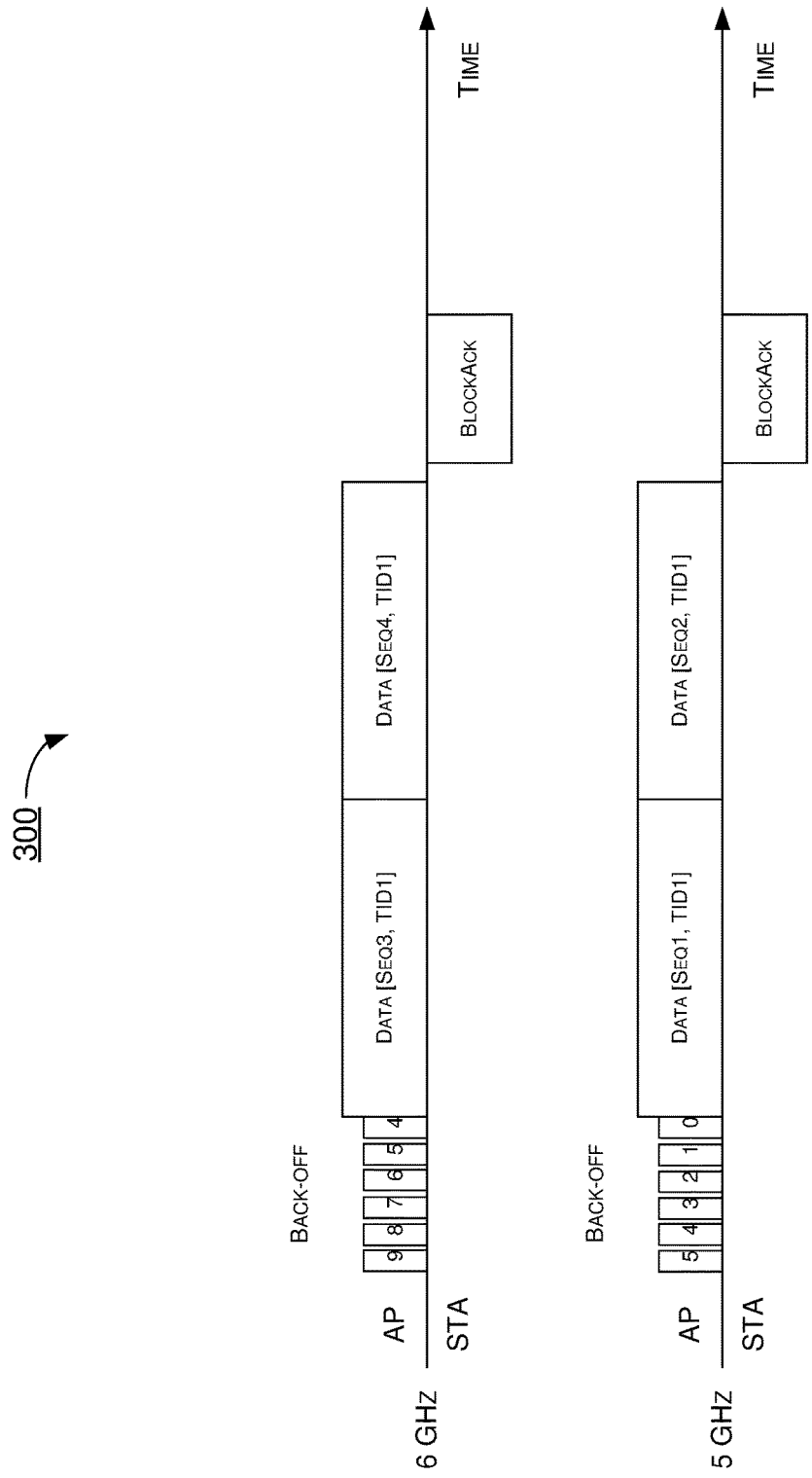
FIG. 3 is a diagram of an example scenario in accordance with the present disclosure.

FIG. 3 illustrates an example scenario 300 of synchronous and constrained multi-link transmissions in accordance with the present disclosure. Referring to FIG. 3, under a proposed scheme in accordance with the present disclosure regarding synchronous multi-link transmissions, after obtaining a TXOP, communication entity 110 may synchronize a starting time and/or an ending time (herein interchangeably referred as "either or both of a starting time and an ending time") of transmissions and receptions on multi-link communication in order to avoid IDC interference. Also referring to FIG. 3, under another proposed scheme in accordance with the present disclosure regarding constrained multi-link transmissions, after obtaining a TXOP, communication entity 110 may not transmit or receive frames on multi-link communication simultaneously in order to avoid IDC interference.

Under the proposed schemes, an early access of other primary channel(s) for which an EDCA does not obtain a TXOP may be allowed in case both the physical carrier sense (CS) and the virtual CS of the other primary channel(s) are idle. The physical CS may be checked during a point coordination function (PCF) inter-frame space (PIFS). Each MPDU of a plurality of MPDUs may be independently encoded into one of a plurality of frequency segments or, alternatively, the plurality of MPDUs may be jointly encoded into more than one frequency segments. With respect to constrained multi-link transmission, communication entity 110, as a STA, may use independent inverse discrete Fourier transform (IDFT) or discrete Fourier transform (DFT) when performing independent encoding and/or decoding on multiple frequency segments.

Synchronous Multi-Link Transmissions

Figure 4:
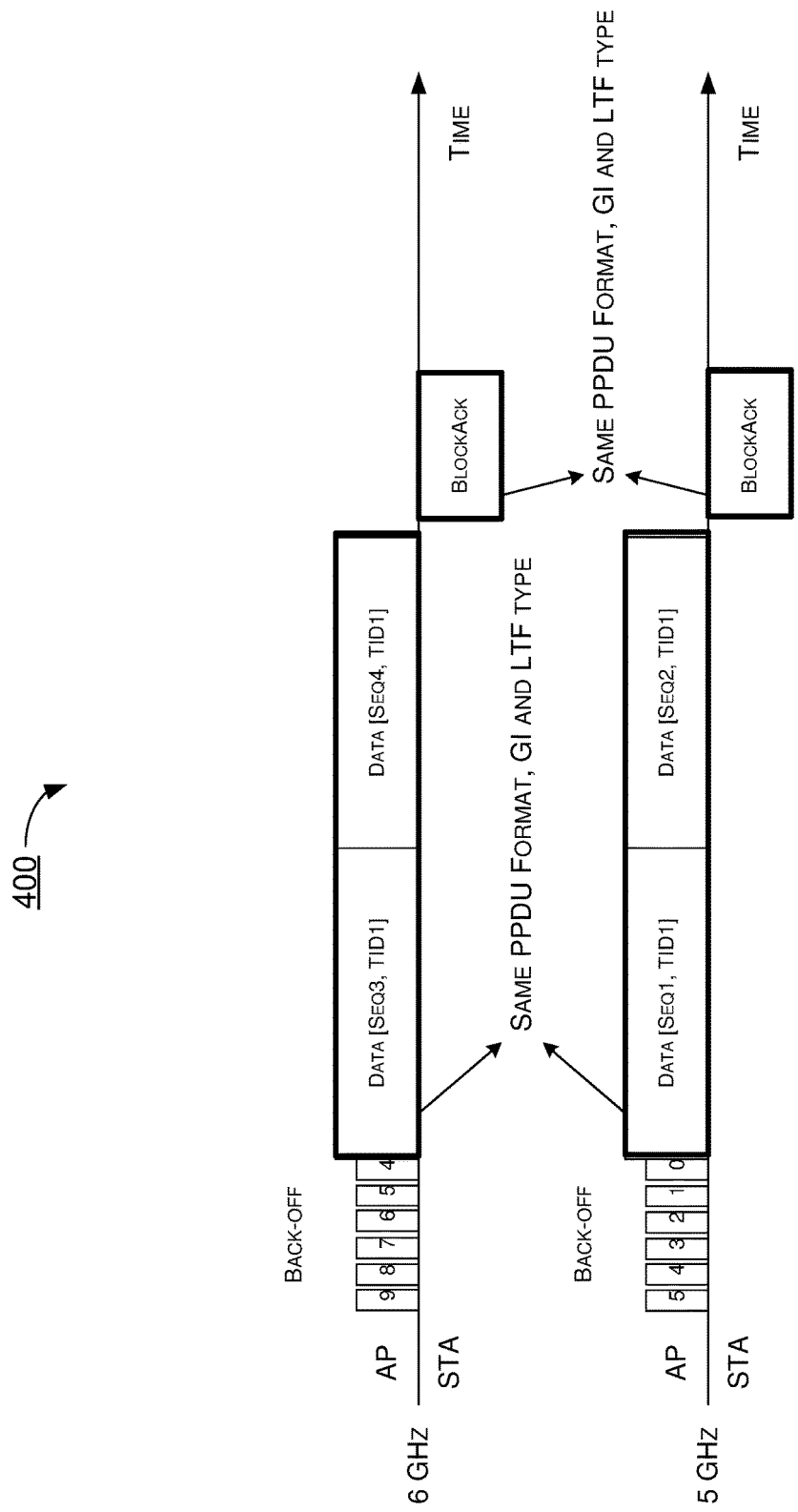
FIG. 4 is a diagram of an example scenario in accordance with the present disclosure.

FIG. 4 illustrates an example scenario 400 of Physical Layer Conformance Procedure (PLCP) Protocol Data Unit (PPDU) synchronization in synchronous multi-link transmissions in accordance with the present disclosure. Referring to FIG. 4, under a proposed scheme in accordance with the present disclosure, there may be various PPDU synchronization mechanisms in synchronous multi-link transmissions. Under the proposed scheme, communication entity 110 may transmit frames on multi-oink in the same PPDU format, same guard interval (GI) and same long training field (LTF) type. Moreover, communication entity 110 may solicit response frames on multi-link transmissions in the same PPDU format, same GI and same LTF type. For instance, when communication entity 110 transmits a high-efficiency (HE) single-user (SU) PPDU on a link, communication entity 110 may transmit only a HE SU PPDU on other links (e.g., non-high throughput (non-HT) PPDU, HT PPDU, very high throughput (VHT) PPDU, HE multi-user (MU) PPDU, HE extended-range (ER) SU PPDU, HE trigger-based (TB) PPDU cannot be transmitted on other links).

Under the proposed scheme, in order to synchronize a starting time and/or an ending time of the transmissions and receptions on multi-link transmissions, the duration of the pre-HE modulated fields may be the same over multi-link transmissions and the duration of the HE modulated fields may be also the same on multi-link transmissions. It is noteworthy that, in a HE PPDU, the legacy short training field (L-STF), legacy long training field (L-LTF), legacy signal field (L-SIG), repeated legacy signal field (RL-SIG), high-efficiency signal A field (HE-SIG-A) and high-efficiency signal B field (HE-SIG-B) may be referred to as pre-HE modulated fields, while the high-efficiency short training field (HE-STF), high-efficiency long training field (HE-LTF) and data field may be referred to as the HE modulated fields. Moreover, a pre-HE modulated field and a HE modulated field have different symbol duration.

Figure 5:
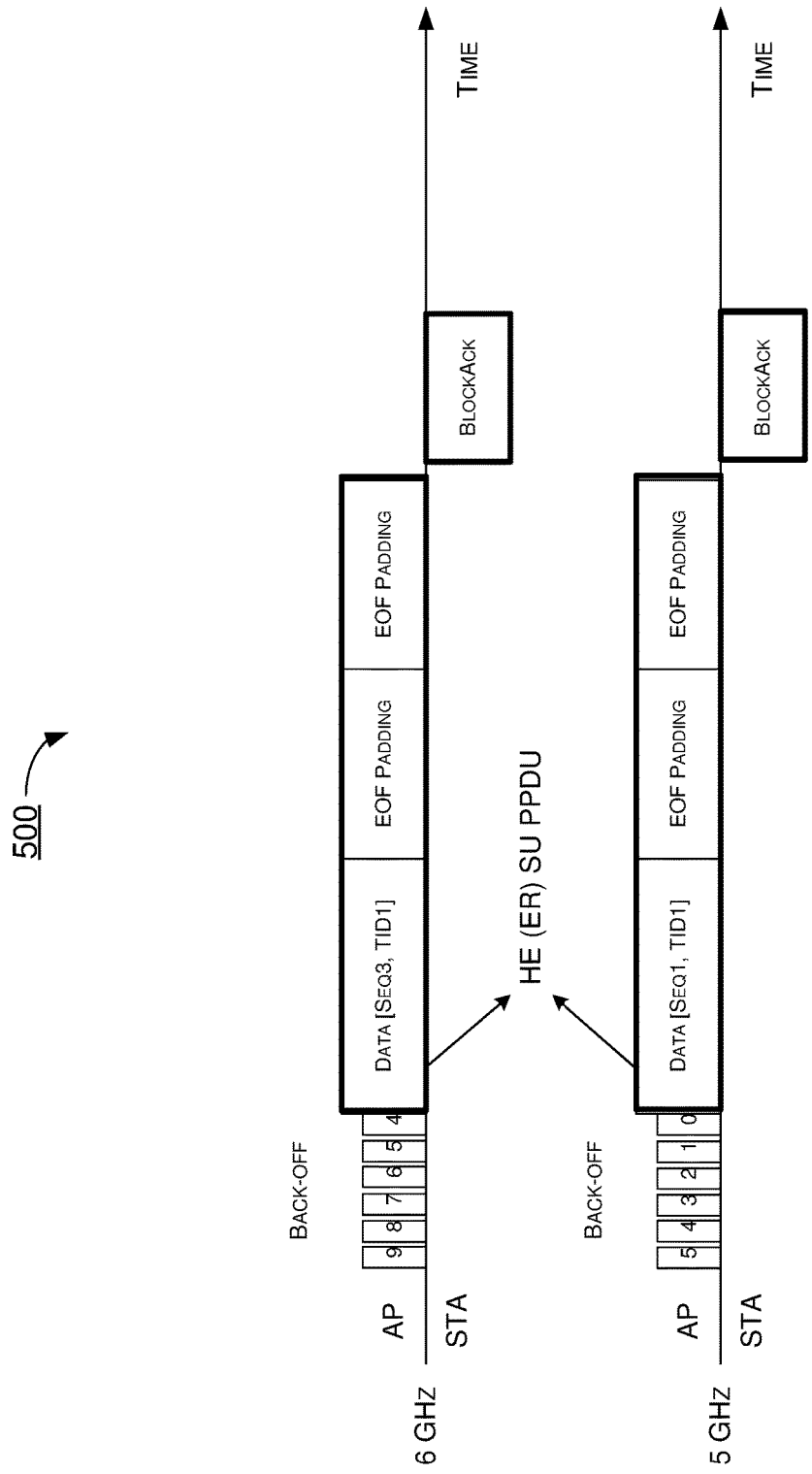
FIG. 5 is a diagram of an example scenario in accordance with the present disclosure.

FIG. 5 illustrates an example scenario 500 of PPDU synchronization in synchronous multi-link transmissions in accordance with the present disclosure. Referring to FIG. 5, under the proposed scheme, a first PPDU synchronization mechanism may involve transmission of HE (ER) SU PPDUs on multi-link transmissions. Specifically, in the first PPDU synchronization mechanism, no additional rules may be needed for pre-HE modulated fields of the HE (ER) SU PPDU because the pre-HE modulated fields of the HE (ER) SU PPDU are not variable. However, for HE modulated fields of the HE (ER) SU PPDU, communication entity 110 may include end of frame (EOF) padding subframes in the aggregate MPDU (A-MPDU) to satisfy the same duration requirement of the HE modulated fields on multi-link transmissions. For instance, communication entity 110 may not include EOF padding subframes in the A-MPDU of the PPDU that is sent on the primary link for which an EDCA obtains a TXOP.

Figure 6:
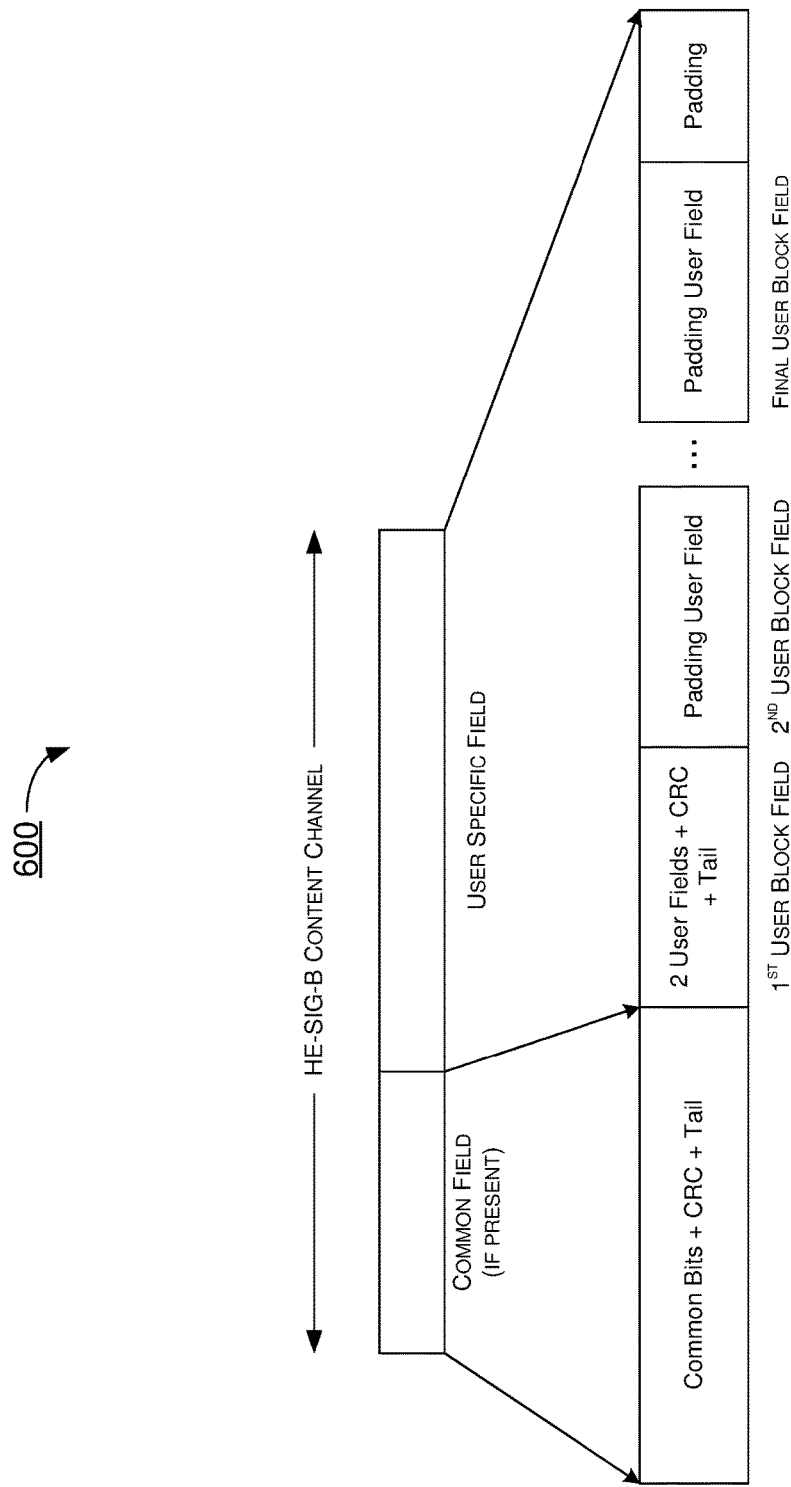
FIG. 6 is a diagram of an example scenario in accordance with the present disclosure.

FIG. 6 illustrates an example scenario 600 of PPDU synchronization in synchronous multi-link transmissions in accordance with the present disclosure. Referring to FIG. 6, under the proposed scheme, a second PPDU synchronization mechanism may involve transmission of HE MU PPDUs on multi-link transmissions. In particular, in the second PPDU synchronization mechanism, the number of symbols of the HE-SIG-B field of the pre-HE modulated fields may be different on multi-link transmissions. Communication entity 110 may include one or more Padding User fields in the User Specific field to satisfy the same duration requirement of the pre-HE modulated fields on multi-link transmissions. For instance, the station identity (STA-ID) subfield of the Padding User field may be set to a pre-determined value (e.g., 2046). For the HE modulated fields of the HE MU PPDU, communication entity 110 may include EOF padding subframes in the A-MPDU to satisfy the same duration requirement of the HE modulated fields over multi-link transmissions. When communication entity 110, as a STA, transmits a HE MU PPDU to a single recipient (e.g., communication entity 120 as an AP), communication entity 110 may not include EOF padding subframes in the A-MPDU of the PPDU that is sent on the primary link for which an EDCA obtains a TXOP.

Under a proposed scheme of PPDU synchronization in synchronous multi-link transmissions in accordance with the present disclosure, the transmission time of response frames sent on multi-link transmissions may be different. This is because the modulation and coding scheme (MCS) or frame size (e.g., acknowledge (Ack) frame or block acknowledgement (BlockAck) frame) of the response frames transmitted on multi-link transmissions may be different. In order to synchronize a starting time and/or an ending time of the transmissions and receptions of the response frames on multi-link transmissions, the MAC layer physical (PHY) layer padding may be necessary. For instance, a STA (e.g., communication entity 110) sending the response frames may use the HE SU PPDU, except when the soliciting STA (e.g., communication entity 120) does not solicit the specific PPDU format (e.g., an HE TB PPDU by the Trigger frame).

Under a proposed scheme of PPDU synchronization in synchronous multi-link transmissions in accordance with the present disclosure, a starting time of the transmissions of the response frames on multi-link transmissions may be synchronized a short inter-frame space (SIFS) after reception of the soliciting frame(s). Moreover, an ending time of the transmissions of the response frames on multi-link transmissions may be determined as one of three options, as described below.

Figure 7:
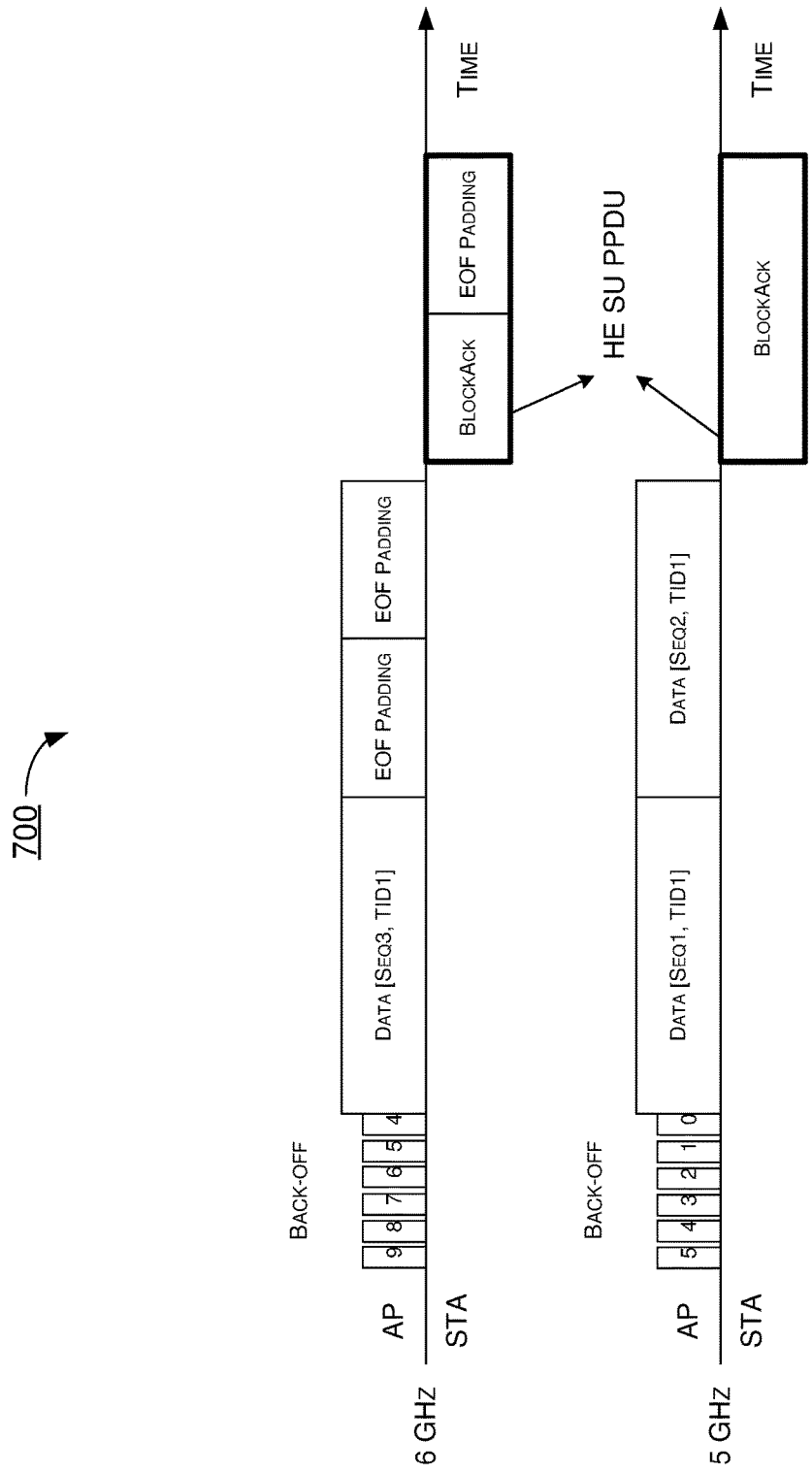
FIG. 7 is a diagram of an example scenario in accordance with the present disclosure.

FIG. 7 illustrates an example scenario 700 of a first option of ending time of transmissions of response frames on multi-link transmissions in accordance with the present disclosure. Referring to FIG. 7, in the first option, the transmission time of the solicited PPDUs (e.g., BlockAck) on multi-link transmissions may be determined to be the longest value of the minimum transmission times of the response frame calculated from the transmit vector (TXVECTOR) parameter of the soliciting PPDU on each link. For instance, initially, the STA (e.g., communication entity 110) may calculate a first minimum transmission time (TXTIME1) of the response frame based on the TXVECTOR parameter of the soliciting PPDU on the 5 GHz link. Moreover, the STA may calculate a second minimum transmission time (TXTIME2) of the response frame based on the TXVECTOR parameter of the soliciting PPDU on the 6 GHz link. Then, a maximum between TXTIME1 and TXTIME2 (e.g., MAX(TXTIME1, TXTIME2)) may be determined to be the transmission time of the response frames on the 5 GHz link and the 6 GHz link. Next, the MAC or PHY padding may be applied on multi-link transmissions to satisfy the same transmission time on both the 5 GHz link and the 6 GHz link.

Figure 8:
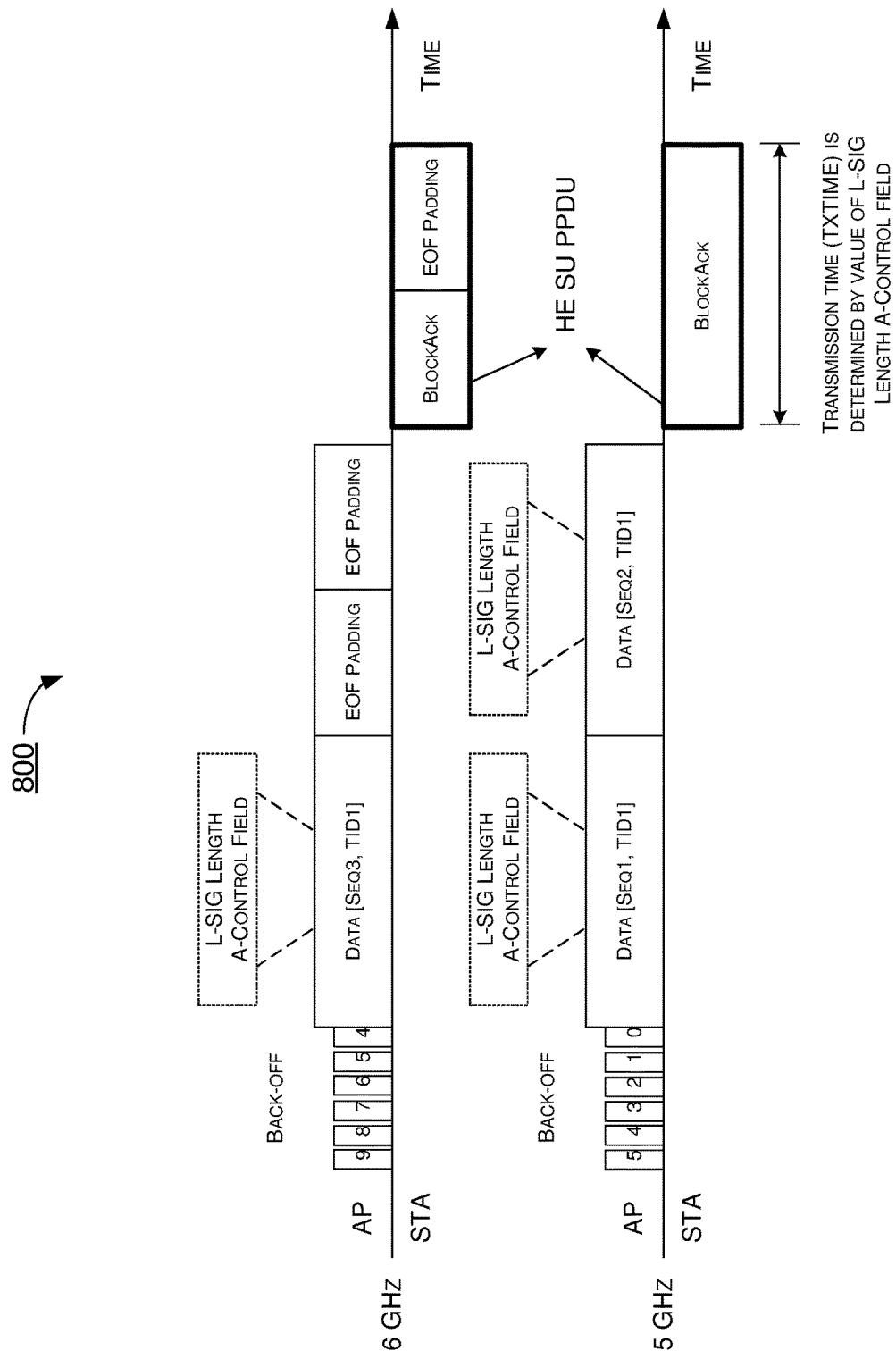
FIG. 8 is a diagram of an example scenario in accordance with the present disclosure.

FIG. 8 illustrates an example scenario 800 of a second option of ending time of transmissions of response frames on multi-link transmissions in accordance with the present disclosure. Referring to FIG. 8, in the second option, the value of the L-SIG Length field of the solicited HE PPDU that carries the response frame may be provided in the A-Control field of the soliciting frame. For instance, the soliciting STA (e.g., communication entity 120) may determine the transmission time of the response frames as specified in the L-SIG Length A-Control field carried in the soliciting frame. In case of necessity, the MAC or PHY padding may be applied on multi-link transmissions to satisfy the same transmission time on both the 5 GHz link and the 6 GHz link.

Figure 9:
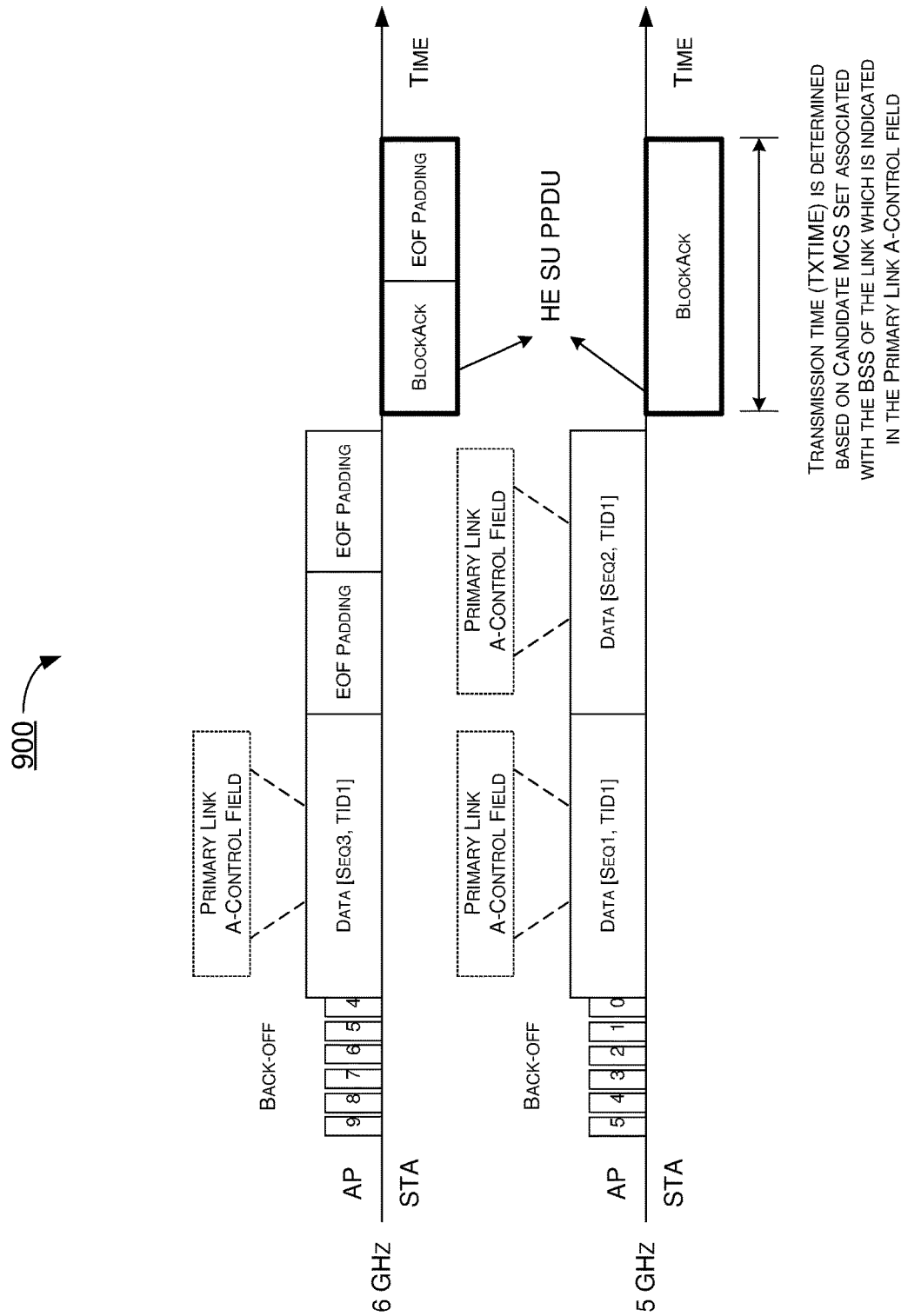
FIG. 9 is a diagram of an example scenario in accordance with the present disclosure.

FIG. 9 illustrates an example scenario 900 of a third option of ending time of transmissions of response frames on multi-link transmissions in accordance with the present disclosure. Referring to FIG. 9, in the third option, the primary link for which an EDCA obtains a TXOP may be specified in the A-Control field of the soliciting frame. The responding STA (e.g., communication 110) may determine the transmission time of the response frames based on the candidate MCS set (CandidateMCSSet) associated with the basic service set (BSS) of the primary link. Accordingly, the transmission time (TXTIME) may be determined from the CandidateMCSSet associated with the BSS of the link which is indicated by the value of the Primary Link A-Control field.

Under a proposed scheme of PPDU synchronization in synchronous multi-link transmissions in accordance with the present disclosure, some control frames may be necessary to be carried in non-HT (duplicate) PPDU(s). For instance, request to sent (RTS) and clear to send (CTS) frames may be carried in non-HT (duplicate) PPDU(s) for the network allocation vector (NAV) protection of the legacy STA. With respect to exchange of RTS and CTS frames in non-HT (e.g., duplicate) PPDU(s) on multi-link transmissions, certain information of the RTS frame sent on each link may be a link-specific value and may be different or the same on multi-link transmissions. Such information may include, for example and without limitation, channel bandwidth, receiver address, transmitter address, and channel bandwidth in non-HT (bandwidth signaling). However, the STA (e.g., communication entity 110) may use the same MCS and same duration information on multi-link transmissions.

Figure 10:
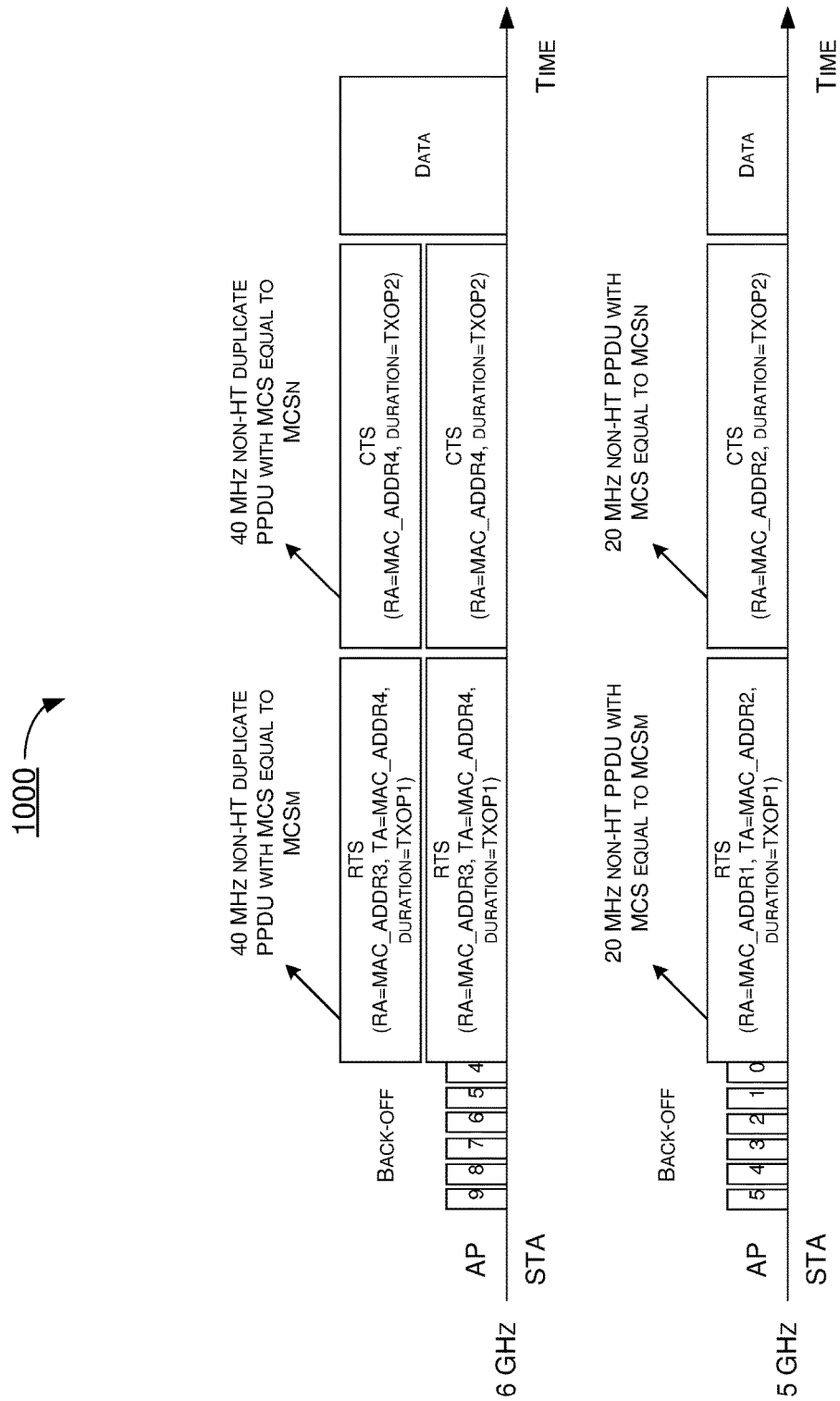
FIG. 10 is a diagram of an example scenario in accordance with the present disclosure.

FIG. 10 illustrates an example scenario 1000 of RTS and CTS frame exchange in non-HT PPDU on multi-link transmissions in accordance with the present disclosure. Referring to FIG. 10, to satisfy the same transmission time, the RTS frames sent on the 5 GHz link and the 6 GHz link may use the same MCSm, and the CTS frames sent on the 5 GHz link and the 6 GHz link may use the same MCSn.

Under the proposed scheme, to allow the transmitting STA to calculate the contents of the Duration/ID field, a STA responding to received RTS frames on multi-link transmissions may transmit its CTS frames on multi-link transmissions at a multi-link primary rate or, alternatively, at a multi-link alternate rate, as described below.

Regarding the multi-link primary rate, the multi-link primary rate may be defined to be the highest rate of common rates in the BSS Basic Rate Set (BSSBasicRateSet) parameters of BSSes associated with multi-link transmissions that is less than or equal to the rate (or non-HT reference rate) of the previous RTS frame. In case no rate in the BSSBasicRateSet parameters meets these conditions, the multi-link primary rate may be defined to be the highest rate of mandatory common rates of the PHYs associated with multi-link transmissions that is less than or equal to the rate (or non-HT reference rate) of the previous RTS frame.

Regarding the multi-link alternate rate, the duration of frame at the multi-link alternate rate may be the same as the duration of the frame at the multi-link primary rate. The multi-link alternate rate may be in either the common rates in BSSBasicRateSet parameters of BSSes associated with multi-link transmissions or may be in mandatory common rates of the PHYs associated with multi-link transmissions. The modulation class of the frame at the multi-link alternate rate may be the same as that of the multi-link primary rate selected by the IEEE specifications for selectin of a rate or MCS (e.g., section 10.6.6.5.2). The STA may transmit the non-HT PPDU CTS frame at either the multi-link primary rate or the multi-link alternate rate, if one exists.

However, in case the responding STA does not receive CTS frames from all links, the multi-link primary rate calculated by the responding STA may be different from what is expected by the transmitting STA. This situation may exist when BSSBasicRateSet parameters of BSSes associated with multi-link transmissions are not the same or when mandatory rates of the PHYs associated with multi-link transmissions are not the same. To avoid this issue, the RTS frame may have an indication for specifying whether it is sent on the primary link for which an EDCA obtains a TXOP. The responding STA may identify the RTS frame transmitted on the primary link. That is, the responding STA may transmit its CTS frames on multi-link transmissions at a primary rate or at an alternate rate associated with the BSS of the primary link.

Under a proposed scheme in accordance with the present disclosure, in the Control frame, the receiver address (RA) and/or transmitter address (TA) field(s) may be used to indicate the primary link. For instance, the RA field of the Control frame transmitted on the non-primary link may have a predetermined value (e.g., MAC address of the STA transmitting the corresponding Control frame, which is the transmitter address). The TA field of the Control frame transmitted on the non-primary link may have a predetermined value (e.g., MAC address of the receiving STA of the transmitted Control frame, which is the receiver address). Under the proposed scheme, a swapping mechanism of the RA and/or TA field(s) may be applied in one of three models, namely: RA field-only swapping, TA field-only swapping, and RA and TA fields dual swapping. In addition to a signal of the primary link, the swapping mechanism may be used to indicate other information. Additionally, when the swapping mechanism is used, the first 7 bits of the scrambling sequence may be redefined. Under current IEEE specification, those bits are used for indicating parameters such as CH_BANDWIDTH_IN_NON_HT and DYN_BANDWIDTH_IN_NON_HT.

Under the proposed scheme, when a peer STA receives the RTS frame on multiple links, the STA may perform certain operations. Firstly, the STA may determine the primary link in case the RA of the RTS frame is set to itself and the TA of the RTS frame is set to the MAC address of a $3^{rd}$ party STA. Secondly, the STA may determine the non-primary link in case the RA of the RTS frame is set to the TA of the RTS frame received on the primary link and/or the TA of the RTS frame is set to the RA of the RTS frame received on the primary link. It is noteworthy that, in case the peer STA receives the RTS frame on the non-primary link only, the STA may not respond with the CTS frame.

Constrained Multi-Link Transmissions

When a STA (e.g., communication entity 110) transmits frames on multi-link transmissions with different TXVECTOR parameters (e.g., PPDU format, GI or LTF type), it may be difficult to exactly synchronize the starting times and ending times of the transmissions on the multiple links. Under a proposed scheme in accordance with the present disclosure, there may be timing accuracy requirement with respect to constrained multi-link transmissions. Under the proposed scheme, the starting times and ending times of the transmissions on the multiple links may be synchronized within a duration expressed as aSIFSTime+aSignalExtension. To meet this requirement, the STA may apply MAC padding, PHY padding and/or packet extension (PE). Here, the parameter aSIFSTime may be 10 μs when operating in the 2.4 GHz band or 16 μs when operating in the 5 GHz band. Moreover, the parameter aSignalExtension may be 0 μs when operating in the 5 GHz band or 6 μs when operating in the 2.4 GHz band. Thus, the duration of aSIFSTime+aSignalExtension may be 16 μs.

Under the proposed scheme, when the same inter-frame spaces (e.g., SIFS, PIFS or AIFS) are used on multi-link transmissions, in case the ending times of the transmissions on the multiple links are synchronized within aSIFSTime+aSignalExtension, the starting times of subsequent transmissions may also be synchronized within aSIFSTime+aSignalExtension. Accordingly, unless the frame(s) is/are initial frame(s) of a TXOP, only the ending times of the transmissions on the multiple links are of concern. That is, there is no need to synchronized the starting times of the initial frames. Given that the timing error caused by orthogonal frequency-division multiplexing (OFDM) symbol misalignment is bounded to less than 16 μs, to meet the timing accuracy requirement (e.g., the ending times of the transmissions on multiple links may be synchronized within the duration of aSIFSTime+aSignalExtension), only MAC padding (e.g., EOF padding subframe or Padding subfield) may be necessary. There may be no changes made on PHY.

Figure 11:
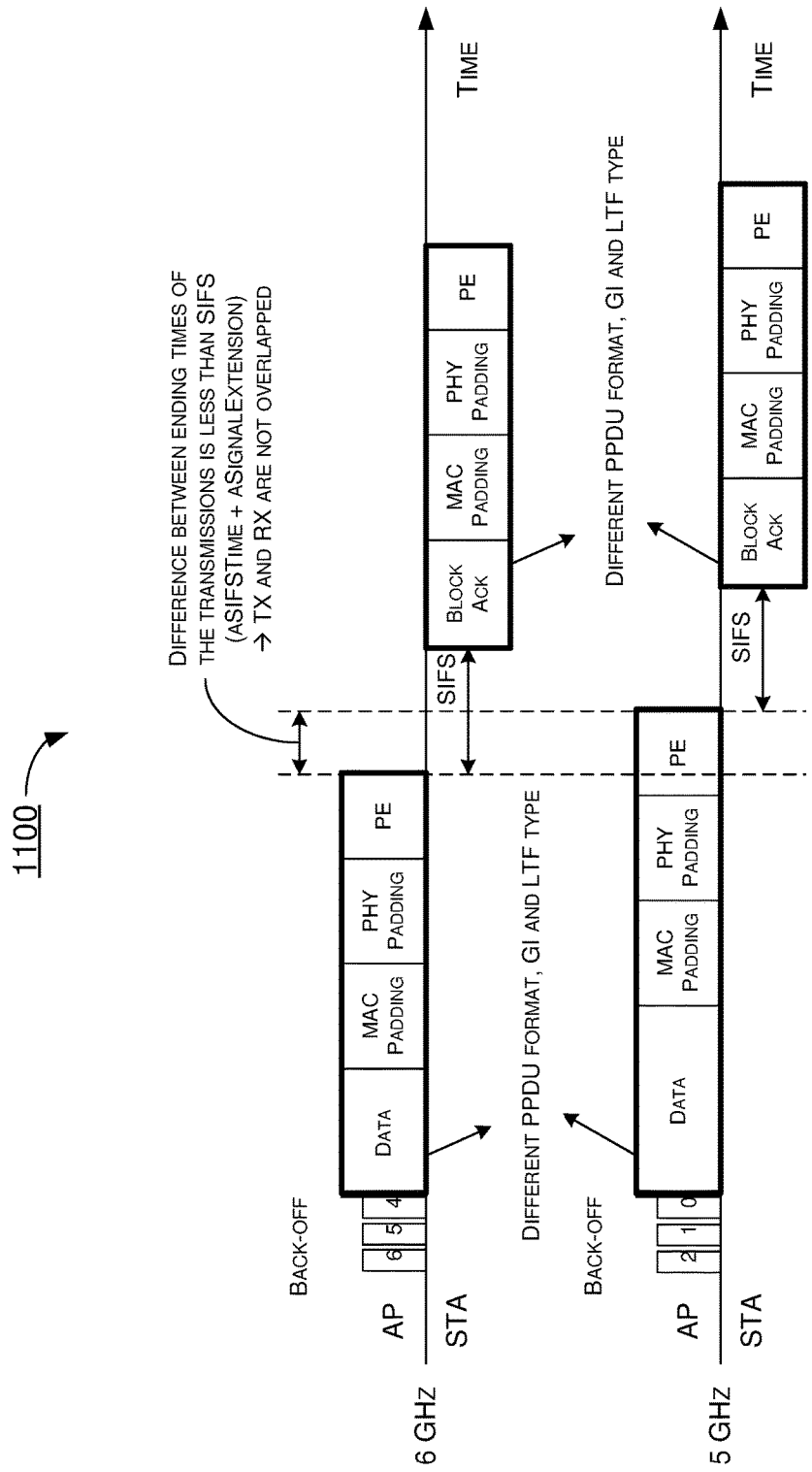
FIG. 11 is a diagram of an example scenario in accordance with the present disclosure.
Figure 12:
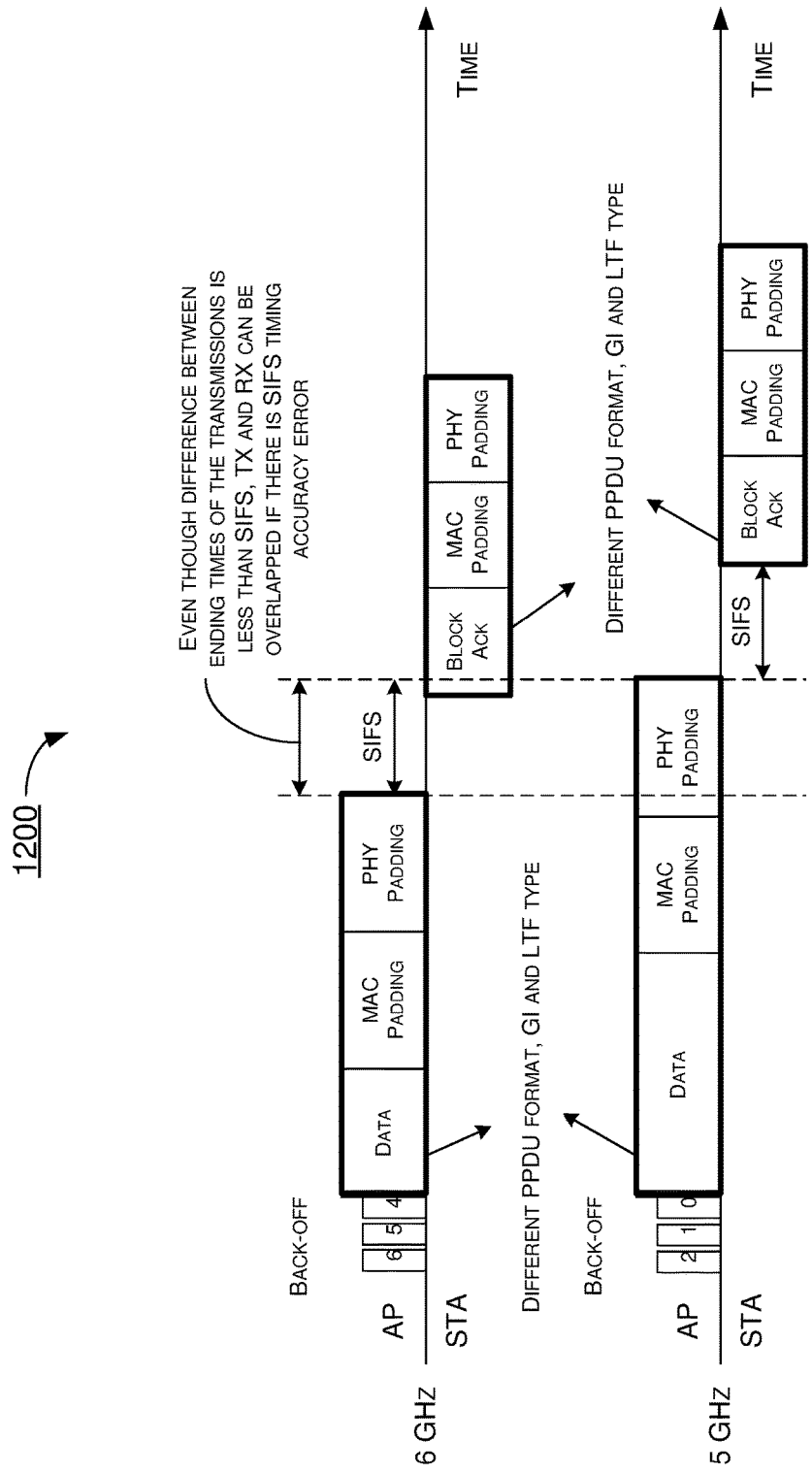
FIG. 12 is a diagram of an example scenario in accordance with the present disclosure.

FIG. 11 illustrates an example scenario 1100 of timing accuracy requirement of constrained multi-link transmissions in accordance with the present disclosure. Referring to FIG. 11, a difference between the ending times of the transmissions on multiple links may be less than a SIFS (e.g., aSIFSTime+aSignalExtension). In scenario 1100, transmission (TX) and receiving (RX) are not overlapped. FIG. 12 illustrates an example scenario 1200 of timing accuracy requirement of constrained multi-link transmissions in accordance with the present disclosure. Referring to FIG. 12, in scenario 1200, the SIFS timing accuracies of STAs (e.g., communication entity 110 and communication entity 120) within the multi-link capable device are not the same. For example, the SIFS timing accuracies may be different within ±0.4 µs based on IEEE 802.11ax requirement for a HE TB PPDU. In such cases, TX and RX may be overlapped.

Under a proposed scheme in accordance with the present disclosure, in order to solve the issue of SIFS timing accuracy error, one of multiple options may be undertaken. According to a first option (option 1), a STA (e.g., communication entity 110) may request its peer STA (e.g., communication entity 120) to include minimum padding information, for which decoding is not necessary, when the peer STA transmits frames on multiple links to the STA. For example, such minimum padding information may include EOF padding subframe, Padding subfield, or PE (e.g., 4 µs, 8 µs, 12 µs or 16 µs). The time requirement of the minimum padding information may be independently signaled to the peer STA. Consequently, TX and RX may be overlapped within a time that the padding information is sent.

According to a second option (option 2), the STA may increase timing accuracy requirement. For example, the ending times of the transmissions on multiple links may be synchronized within a duration of aSIFSTime+aSignalExtension−TimingErrorMargin. When the STA receives the timing error margin (TimingErrorMargin) information from the peer STA, the TimingErrorMargin may indicate that the peer STA can respond to the STA within a duration of aSIFSTime+aSignalExtension±TimingErrorMargin from the end of the soliciting frame.

It is noteworthy that, because the receiving STA does not decode the PE (e.g., 4 µs, 8 µs, 12 µs or 16 µs) while the STA is receiving the PE, the STA may transmit frames on other links simultaneously. In case that overlapping of TX and RX within the PE is allowed, the performance may be slightly improved as the STA may send frame(s) earlier without awaiting a reception of the PE. In an alternative approach, the ending times of the transmissions excluding the PE on multiple links may be synchronized with the duration of aSIFSTime+aSignalExtension. Accordingly, MAC padding (e.g., EOF padding subframe and Padding subfield) may be applied.

Figure 13:
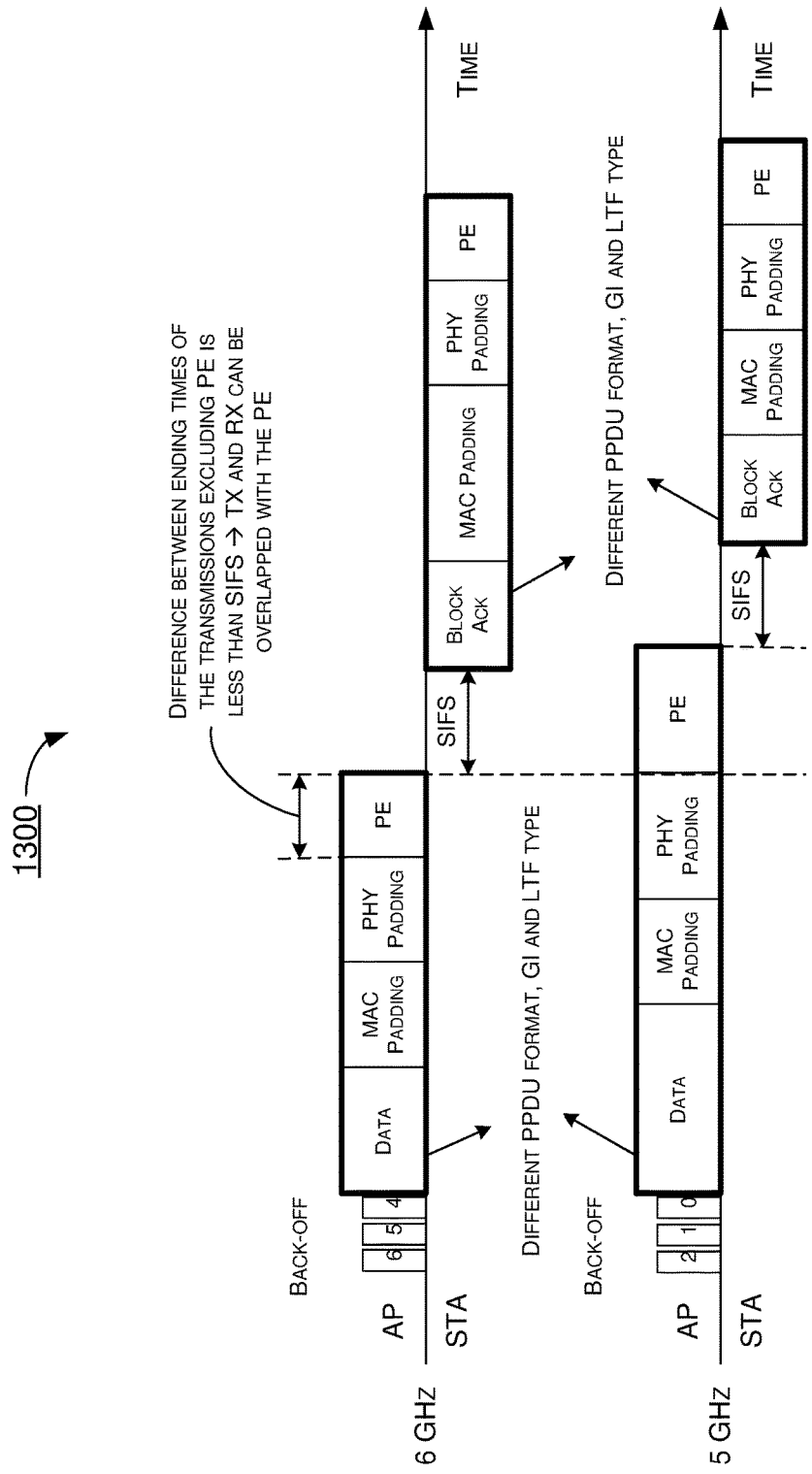
FIG. 13 is a diagram of an example scenario in accordance with the present disclosure.

FIG. 13 illustrates an example scenario 1300 of timing accuracy requirement of constrained multi-link transmissions in accordance with the present disclosure. Referring to FIG. 13, in scenario 1300, a difference between the ending times of the transmissions excluding the PE may be less than a SIFS. Accordingly, TX and RX may be overlapped within the PE. In order to solve the issue of SIFS timing accuracy error, option 1 and/or option 2 described above may be applied.

Under a proposed scheme in accordance with the present disclosure, for a HE TB PPDU transmission, starting times of the transmissions on multiple links may be aligned. In such cases, a STA (e.g., communication entity 110) may choose the PEs among 4 µs, 8 µs, 12 µs or 16 µs that makes a difference between ending times of the transmissions not greater than aSlotTime. Under the proposed scheme, the duration of the PE field may be determined by both a pre-forward error correction (FEC) padding factor value in the last OFDM symbol(s) of the Data field, and the TXVECTOR parameter NORMAL_PACKET_PADDING. Accordingly, the STA may set the pre-FEC padding factor value and the TXVECTOR parameter NORMAL_PACKET_PADDING to meet the above condition.

Figure 14:
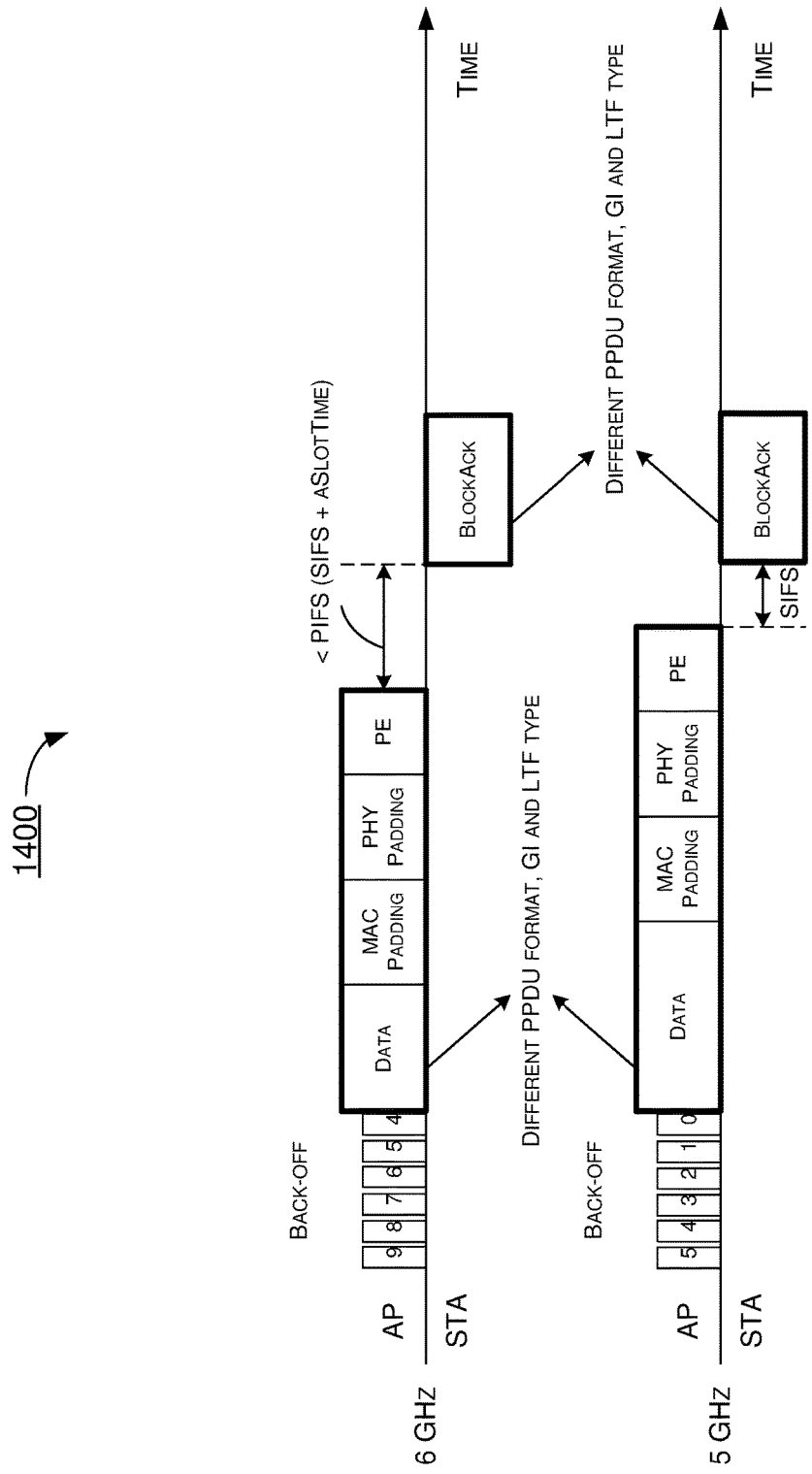
FIG. 14 is a diagram of an example scenario in accordance with the present disclosure.
Figure 15:
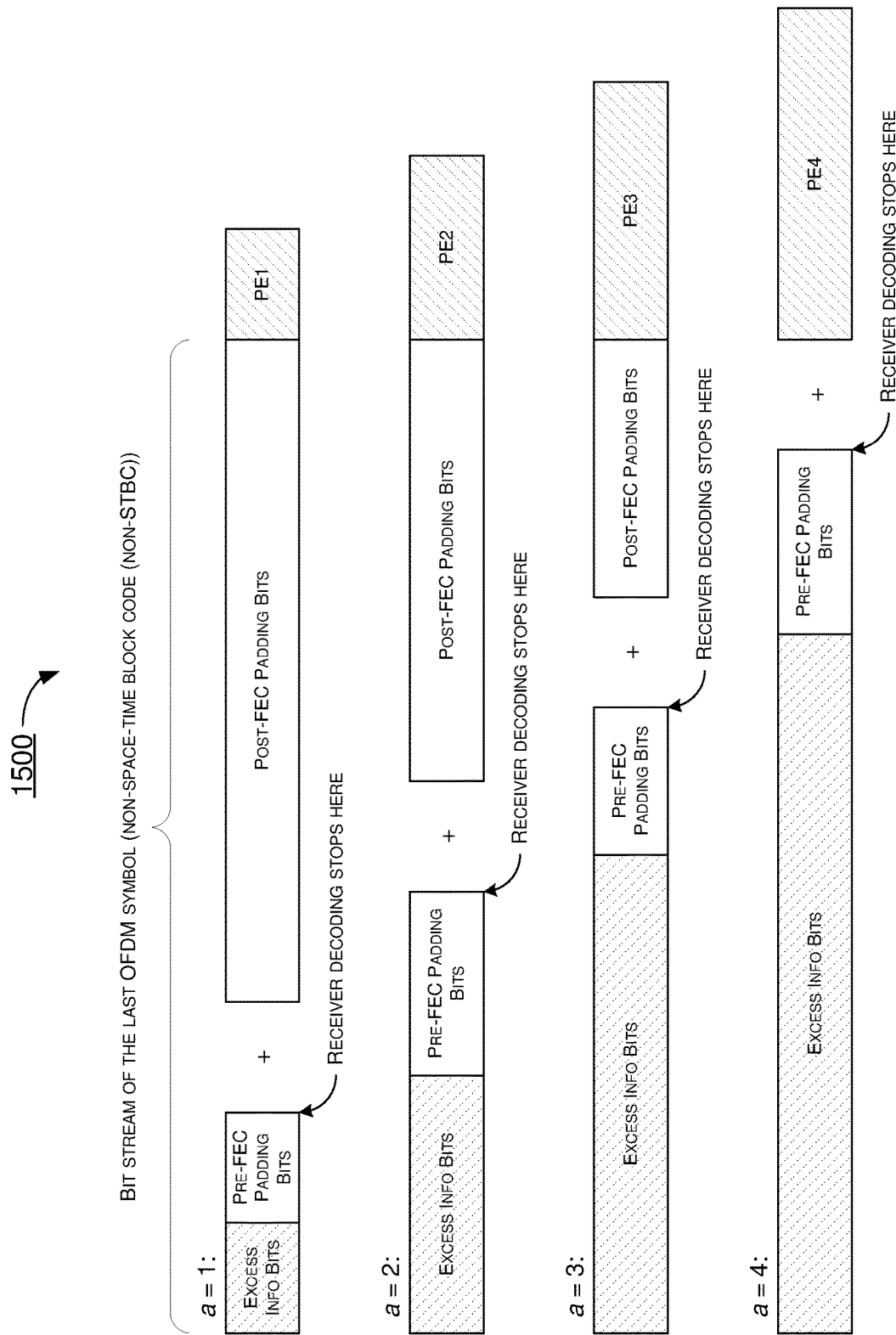
FIG. 15 is a diagram of an example scenario in accordance with the present disclosure.

FIG. 14 illustrates an example scenario 1400 of timing accuracy requirement of constrained multi-link transmissions in accordance with the present disclosure. Referring to FIG. 14, in scenario 1400, the STAs of 6 GHz and 5 GHz may be transmitting response frames simultaneously. However, the inter-frame space in 6 GHz may be longer than a SIFS which may be shorter than a PIFS. FIG. 15 illustrates an example scenario 1500 of timing accuracy requirement of constrained multi-link transmissions in accordance with the present disclosure.

Under a proposed scheme in accordance with the present disclosure, when an AP multi-link device (MLD) intends to align an ending time of downlink (DL) PPDUs carrying a frame soliciting an immediate response simultaneously sent to a same non-simultaneous-transmit-and-receive (non-STR) non-AP MLD on multiple links, the AP MLD may ensure that a difference between ending times of transmitting DL PPDUs is less than a certain duration (e.g., less than a SIFS).

Under a proposed scheme in accordance with the present disclosure, with respect to PHY layer management entity (PLME) service access point (SAP) interface, a PLMN-TXTIME.confirm primitive may be utilized to indicate the time required to transmit the PPDU described in a corresponding PLME-TXTIME.request primitive. This primitive may be expressed as PLME-TXTIME.confirm(TXTIME, PSDU_LENGH[ ]). The TXTIME represents the time (e.g., in microseconds) required to transmit the PPDU described in the corresponding PLME-TXTIME.request primitive. In case the calculated time includes a fractional microsecond and the TXVECTOR parameter FORMAT in the corresponding PLME-TXTIME.request primitive is not HE_SU, HE_MU, HE_TB or HE_ER_SU, a non-directional multi-gigabit (non-DMG) STA may round the TXTIME value to the next higher integer. A non-DMG STA may not round the TXTIME value up or down in an event that the TXVECTOR parameter FORMAT in the corresponding PLME-TXTIME.request primitive is HE_SU, HE_MU, HE_TB or HE_ER_SU. A DMG STA may not round the TXTIME value up or down. The length of PLOP Service Data Unit (PSDU) (PSDU_LENGH[ ]) parameter may be an array of size TXVECTOR parameter NUM_USERS. Each value in the array may indicate the number of octets required to fill the PPDU for the user represented by that array index. The parameter may be present only when the TXVECTOR FORMAT parameter is very high-throughput (VHT).

The PLME-TXTIME.request primitive may be a request for the PHY to calculate the time required to transmit onto the wireless medium a PPDU containing a PSDU of a specified length and using a specified format, data rate and signaling. This primitive may be expressed as PLME-TXTIME.request(TXVECTOR, REMAINING_TXTIME[ ]). The TXVECTOR represents a list of parameters that the MAC sublayer provides to the local PY entity in order to transmit a PSDU. The minimum required PHY parameters are listed in section 8.3.4.4 of the IEEE specification. The REMAINING_TXTIME[ ] parameter is an array of the simultaneous links count size. Each value in the array indicates the remaining time (e.g., in microseconds) required to transmit the ongoing PPDU on the link represented by that array index. The parameter is present only when the TXVECTOR FORMAT parameter is EHT and at least one PPDU is under a transmission on one of the multiple links. This primitive may be issued by the MAC sublayer to the PHY entity when the MAC sublayer needs to determine the time required to transmit a particular PSDU. The effect of receipt of this primitive by the PHY entity is to generate a PHY-TXTIME.confirm primitive that conveys the required transmission time. When the REMAINING_TXTIME[ ] parameter is present, the required transmission time may be within a difference of aSIFSTime+aSignalExtension with all times indicated in REMAINING_TXTIME[ ] parameter. Accordingly, when a STA (e.g., communication entity 110) receives information of a timing error margin (TimingErrorMargin) from its peer STA (e.g., communication entity 120), the difference of aSIFSTime+aSignalExtension may be aSIFSTime+aSignalExtension−TimingErrorMargin.

Illustrative Implementations

Figure 16:
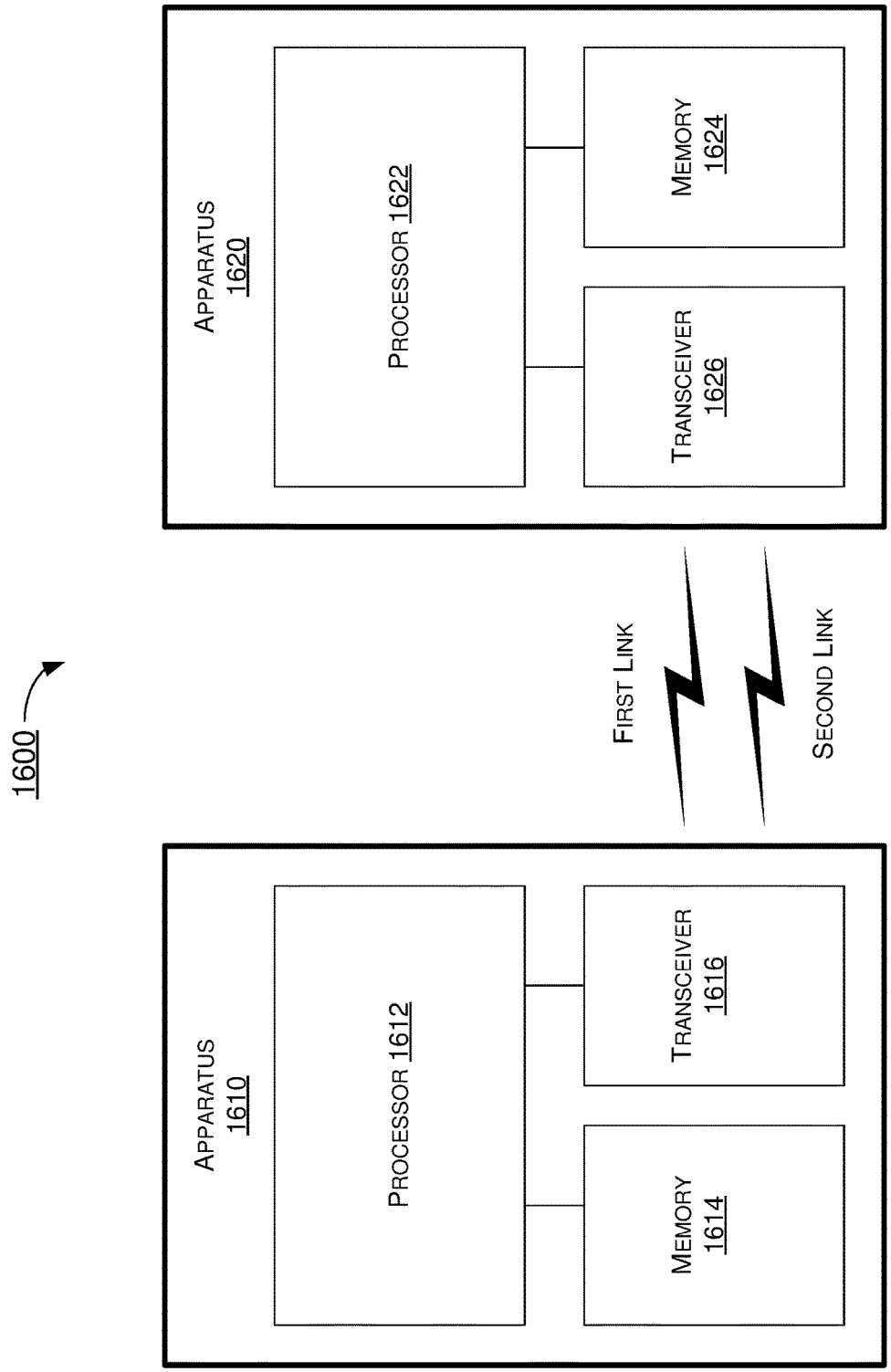
FIG. 16 is a block diagram of an example communication system in accordance with an implementation of the present disclosure.

FIG. 16 illustrates an example system 1600 having at least an example apparatus 1610 and an example apparatus 1620 in accordance with an implementation of the present disclosure. Each of apparatus 1610 and apparatus 1620 may perform various functions to implement schemes, techniques, processes and methods described herein pertaining to EHT synchronous and constrained multi-link transmissions in WLANs, including the various schemes described above with respect to various proposed designs, concepts, schemes, systems and methods described above as well as processes described below. For instance, apparatus 1610 may be an example implementation of communication entity 110, and apparatus 1620 may be an example implementation of communication entity 120.

Each of apparatus 1610 and apparatus 1620 may be a part of an electronic apparatus, which may be a STA or an AP, such as a portable or mobile apparatus, a wearable apparatus, a wireless communication apparatus or a computing apparatus. For instance, each of apparatus 1610 and apparatus 1620 may be implemented in a smartphone, a smart watch, a personal digital assistant, a digital camera, or a computing equipment such as a tablet computer, a laptop computer or a notebook computer. Each of apparatus 1610 and apparatus 1620 may also be a part of a machine type apparatus, which may be an IoT apparatus such as an immobile or a stationary apparatus, a home apparatus, a wire communication apparatus or a computing apparatus. For instance, each of apparatus 1610 and apparatus 1620 may be implemented in a smart thermostat, a smart fridge, a smart door lock, a wireless speaker or a home control center. When implemented in or as a network apparatus, apparatus 1610 and/or apparatus 1620 may be implemented in a network node, such as an AP in a WLAN.

In some implementations, each of apparatus 1610 and apparatus 1620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1610 and apparatus 1620 may be implemented in or as a STA or an AP. Each of apparatus 1610 and apparatus 1620 may include at least some of those components shown in FIG. 16 such as a processor 1612 and a processor 1622, respectively, for example. Each of apparatus 1610 and apparatus 1620 may further include one or more other components not pertinent to the proposed scheme of the present disclosure (e.g., internal power supply, display device and/or user interface device), and, thus, such component(s) of apparatus 1610 and apparatus 1620 are neither shown in FIG. 16 nor described below in the interest of simplicity and brevity.

In one aspect, each of processor 1612 and processor 1622 may be implemented in the form of one or more single-core processors, one or more multi-core processors, one or more RISC processors or one or more CISC processors. That is, even though a singular term "a processor" is used herein to refer to processor 1612 and processor 1622, each of processor 1612 and processor 1622 may include multiple processors in some implementations and a single processor in other implementations in accordance with the present disclosure. In another aspect, each of processor 1612 and processor 1622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1612 and processor 1622 is a special-purpose machine specifically designed, arranged and configured to perform specific tasks including those pertaining to EHT synchronous and constrained multi-link transmissions in WLANs in accordance with various implementations of the present disclosure.

In some implementations, apparatus 1610 may also include a transceiver 1616 coupled to processor 1612. Transceiver 1616 may be capable of wirelessly transmitting and receiving data. In some implementations, apparatus 1620 may also include a transceiver 1626 coupled to processor 1622. Transceiver 1626 may include a transceiver capable of wirelessly transmitting and receiving data.

In some implementations, apparatus 1610 may further include a memory 1614 coupled to processor 1612 and capable of being accessed by processor 1612 and storing data therein. In some implementations, apparatus 1620 may further include a memory 1624 coupled to processor 1622 and capable of being accessed by processor 1622 and storing data therein. Each of memory 1614 and memory 1624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1614 and memory 1624 may include a type of read-only memory (ROM) such as mask ROM, programmable ROM (PROM), erasable programmable ROM (EPROM) and/or electrically erasable programmable ROM (EEPROM). Alternatively, or additionally, each of memory 1614 and memory 1624 may include a type of non-volatile random-access memory (NVRAM) such as flash memory, solid-state memory, ferroelectric RAM (FeRAM), magnetoresistive RAM (MRAM) and/or phase-change memory.

Each of apparatus 1610 and apparatus 1620 may be a communication entity capable of communicating with each other using various proposed schemes in accordance with the present disclosure. For illustrative purposes and without limitation, a description of capabilities of apparatus 1610, as communication entity 110, and apparatus 1620, as communication entity 120, is provided below. It is noteworthy that, although the example implementations described below are provided in the context of WLAN, the same may be implemented in other types of networks. Thus, although the following description of example implementations pertains to a scenario in which apparatus 1610 functions as a transmitting device and apparatus 1620 functions as a receiving device, the same is also applicable to another scenario in which apparatus 1610 functions as a receiving device and apparatus 1620 functions as a transmitting device.

Under a proposed scheme with respect to synchronized multi-link transmissions in accordance with the present disclosure, processor 1612 of apparatus 1610 may communicate with apparatus 1620 via a first link in a first frequency band and via a second link in a second frequency band different than the first frequency band by performing certain operations. For instance, processor 1612 may perform an independent EDCA on each of the first link and the second link. Additionally, processor 1612 may obtain a TXOP. Moreover, processor 1612 may synchronize a starting time and/or an ending time of a transmission and a reception on the first link and the second link to avoid causing an IDC interference due to the transmission and the reception occurring simultaneously.

In some implementations, in synchronizing the starting time and/or the ending time of the transmission and the reception on the first link and the second link, processor 1612 may perform certain operations. For instance, processor 1612 may identify a value in a L-SIG Length A-Control field carried in a soliciting frame. Additionally, processor 1612 may determine a transmission time of a response frame to be transmitted in response to the soliciting frame based on the identified value. Moreover, processor 1612 may transmit the response frame at the transmission time on the first link and the second link.

In some implementations, in synchronizing the starting time and/or the ending time of the transmission and the reception on the first link and the second link, processor 1612 may apply a MAC layer padding, a PHY layer padding, or both the MAC layer padding and the PHY layer padding, on the first link and the second link in determining the transmission time.

In some implementations, in synchronizing the starting time and/or the ending time of the transmission and the reception on the first link and the second link, processor 1612 may perform certain operations. For instance, processor 1612 may calculate a first minimum transmission time of a response frame based on a TXVECTOR parameter of a soliciting PPDU on the first link. Additionally, processor 1612 may calculate a second minimum transmission time of the response frame based on another TXVECTOR parameter of another soliciting PPDU on the second link. Moreover, processor 1612 may determine either the first minimum transmission time or the second minimum transmission time, whichever is higher, to be a transmission time of the response frame. Furthermore, processor 1612 may apply a MAC layer padding, a PHY layer padding, or both the MAC layer padding and the PHY layer padding, on the first link and the second link in determining the transmission time. Additionally, processor 1612 may transmit the response frame at the transmission time on the first link and the second link.

In some implementations, in synchronizing the starting time and/or the ending time of the transmission and the reception on the first link and the second link, processor 1612 may synchronize a start time of a transmission of one or more response frames on the first link and the second link at a SIFS after reception of one or more soliciting frames.

In some implementations, in communicating with apparatus 1620, processor 1612 may perform an early access of one other primary channel for which no TXOP is obtained for a respective EDCA for the other primary channel in an event that a physical CS and a virtual CS of the other primary channel are idle. In such cases, the physical CS may be checked during a PIFS.

In some implementations, in communicating with apparatus 1620, processor 1612 may either: (a) independently encode each MPDU of a plurality of MPDUs into one of a plurality of frequency segments; or (b) jointly encode the plurality of MPDUs into the plurality of frequency segments.

In some implementations, in synchronizing, processor 1612 may transmit one or more frames on the first link and the second link in a same PPDU format, a same GI, and a same LTF type.

In some implementations, in synchronizing, processor 1612 may receive one or more response frames on the first link and the second link in a same PPDU format, a same GI, and a same LTF type.

In some implementations, in synchronizing the starting time and/or the ending time of the transmission and the reception on the first link and the second link, processor 1612 may perform certain operations. For instance, processor 1612 may maintain a same duration for one or more pre-HE modulated fields over the first link and the second link. Additionally, processor 1612 may maintain a same duration for one or more HE modulated fields over the first link and the second link.

In some implementations, the one or more pre-HE modulated fields may include one or more of the following: a L-STF, a L-LTF, a L-SIG field, a RL-SIG field, a HE-SIG-A field and a HE-SIG-B field. In some implementations, the one or more HE modulated fields may include one or more of the following: a HE-STF, a HE-LTF and a data field.

In some implementations, in maintaining the same duration for the one or more HE modulated fields over the first link and the second link, processor 1612 may transmit one or more EOF padding subframes in an A-MPDU in one or more HE modulated fields of a HE SU PPDU transmitted on the first link and the second link or a HE MU PPDU transmitted on the first link and the second link.

In some implementations, in maintaining the same duration for the one or more pre-HE modulated fields over the first link and the second link, processor 1612 may add one or more Padding User fields in a User Specific field of a HE-SIG-B field.

Under another proposed scheme with respect to constrained multi-link transmissions in accordance with the present disclosure, processor 1612 of apparatus 1610 may communicate with apparatus 1620 via a first link in a first frequency band and via a second link in a second frequency band different than the first frequency band by performing certain operations. For instance, processor 1612 may perform an independent EDCA on each of the first link and the second link. Additionally, processor 1612 may obtain a TXOP. Moreover, processor 1612 may refrain from transmitting and receiving on the first link and the second link simultaneously to avoid causing an IDC interference.

In some implementations, in refraining from transmitting and receiving on the first link and the second link simultaneously, processor 1612 may synchronize a starting time and/or an ending time of transmissions on the first link and the second link within a predefined duration (e.g., aSIFS-Time+aSignalExtension) by applying a MAC layer padding, a PHY layer padding, or a PE.

In some implementations, in synchronizing the starting time and/or the ending time of transmissions on the first link and the second link, processor 1612 may synchronize a first ending time of a first transmission on the first link and a second ending time of a second transmission on the second link to be within a shortened duration which is determined by subtracting a timing error margin from the predefined duration.

In some implementations, in synchronizing the starting time and/or the ending time of transmissions on the first link and the second link further, processor 1612 may receive, from apparatus 1620, information related to the timing error margin indicating that apparatus 1620 is able to respond within the predefined duration plus or minus the timing error margin from an end of a soliciting frame.

In some implementations, a difference between a first ending time of a first transmission on the first link and a second ending time of a second transmission on the second link may be less than a SIFS. In such cases, there may be no overlap between transmitting and receiving by the first apparatus. Alternatively, an overlap between transmitting and receiving by the first apparatus may be permissible when there is a SIFS timing accuracy error.

In some implementations, apparatus 1610 may function as an AP MLD, and apparatus 1620 may function as a non-STR non-AP MLD. In such cases, in synchronizing the starting time and/or the ending time of the transmission and the reception on the first link and the second link, processor 1612 may align an ending time of a DL PPDU carrying a frame that solicits a response simultaneously sent to apparatus 1620 on the first link and the second link, with a difference between a first ending time of a first transmission on the first link and a second ending time of a second transmission on the second link being less than a certain duration (e.g., SIFS).

In some implementations, in communicating, processor 1612 may also perform an early access of one other primary channel for which no TXOP is obtained for a respective EDCA for the other primary channel in an event that a physical CS and a virtual CS of the other primary channel are idle. In such cases, the physical CS may be checked during a PIFS.

In some implementations, in communicating, processor 1612 may either: (a) independently encode each MPDU of a plurality of MPDUs into one of a plurality of frequency segments; or (b) jointly encode the plurality of MPDUs into the plurality of frequency segments. In such cases, in independently encoding each MPDU of the plurality of MPDUs, processor 1612 may use an independent DFT or an independent IDFT in independently encoding each MPDU of the plurality of MPDUs.

Illustrative Processes

FIG. 17 illustrates an example process 1700 in accordance with an implementation of the present disclosure. Process 1700 may represent an aspect of implementing various proposed designs, concepts, schemes, systems and methods described above. More specifically, process 1700 may represent an aspect of the proposed concepts and schemes pertaining to EHT synchronous and constrained multi-link transmissions in WLANs in accordance with the present disclosure. Process 1700 may include one or more operations, actions, or functions as illustrated by one or more of blocks 1710 and sub-blocks 1712, 1714 and 1716. Although illustrated as discrete blocks, various blocks of process 1700 may be divided into additional blocks, combined into fewer blocks, or eliminated, depending on the desired implementation. Moreover, the blocks/sub-blocks of process 1700 may be executed in the order shown in FIG. 17 or, alternatively in a different order. Furthermore, one or more of the blocks/sub-blocks of process 1700 may be executed repeatedly or iteratively. Process 1700 may be implemented by or in apparatus 1610 and apparatus 1620 as well as any variations thereof. Solely for illustrative purposes and without limiting the scope, process 1700 is described below in the context of apparatus 1610 as communication entity 110 (e.g., a STA or AP) and apparatus 1620 as communication entity 120 (e.g., a peer STA or AP) of a wireless network such as a WLAN in accordance with one or more of IEEE 802.11 standards. Process 1700 may begin at block 1710.

At 1710, process 1700 may involve processor 1612 of apparatus 1610 communicating with apparatus 1620 via a first link in a first frequency band and via a second link in a second frequency band different than the first frequency band by performing operations represented by 1712, 1714 and 1716.

At 1712, process 1700 may involve processor 1612 performing an independent EDCA on each of the first link and the second link. Process 1700 may proceed from 1712 to 1714.

At 1714, process 1700 may involve processor 1612 obtaining a TXOP. Process 1700 may proceed from 1714 to 1716.

At 1716, process 1700 may involve processor 1612 synchronizing a starting time and/or an ending time of a transmission and a reception on the first link and the second link to avoid causing an IDC interference due to the transmission and the reception occurring simultaneously.

In some implementations, in synchronizing the starting time and/or the ending time of the transmission and the reception on the first link and the second link, process 1700 may involve processor 1612 performing certain operations. For instance, process 1700 may involve processor 1612 identifying a value in a L-SIG Length A-Control field carried in a soliciting frame. Additionally, process 1700 may involve processor 1612 determining a transmission time of a response frame to be transmitted in response to the soliciting frame based on the identified value. Moreover, process 1700 may involve processor 1612 transmitting the response frame at the transmission time on the first link and the second link.

In some implementations, in synchronizing the starting time and/or the ending time of the transmission and the reception on the first link and the second link, process 1700 may further involve processor 1612 applying a MAC layer padding, a PHY layer padding, or both the MAC layer padding and the PHY layer padding, on the first link and the second link in determining the transmission time.

In some implementations, in synchronizing the starting time and/or the ending time of the transmission and the reception on the first link and the second link, process 1700 may involve processor 1612 performing certain operations. For instance, process 1700 may involve processor 1612 calculating a first minimum transmission time of a response frame based on a TXVECTOR parameter of a soliciting PPDU on the first link. Additionally, process 1700 may involve processor 1612 calculating a second minimum transmission time of the response frame based on another TXVECTOR parameter of another soliciting PPDU on the second link. Moreover, process 1700 may involve processor 1612 determining either the first minimum transmission time or the second minimum transmission time, whichever is higher, to be a transmission time of the response frame. Furthermore, process 1700 may involve processor 1612 applying a MAC layer padding, a PHY layer padding, or both the MAC layer padding and the PHY layer padding, on the first link and the second link in determining the transmission time. Additionally, process 1700 may involve processor 1612 transmitting the response frame at the transmission time on the first link and the second link.

In some implementations, in synchronizing the starting time and/or the ending time of the transmission and the reception on the first link and the second link, process 1700 may involve processor 1612 synchronizing a start time of a transmission of one or more response frames on the first link and the second link at a SIFS after reception of one or more soliciting frames.

In some implementations, in communicating with apparatus 1620, process 1700 may also involve processor 1612 performing an early access of one other primary channel for which no TXOP is obtained for a respective EDCA for the other primary channel in an event that a physical CS and a virtual CS of the other primary channel are idle. In such cases, the physical CS may be checked during a PIFS.

In some implementations, in communicating with apparatus 1620, process 1700 may also involve processor 1612 either: (a) independently encoding each MPDU of a plurality of MPDUs into one of a plurality of frequency segments; or (b) jointly encoding the plurality of MPDUs into the plurality of frequency segments.

In some implementations, in synchronizing, process 1700 may involve processor 1612 transmitting one or more frames on the first link and the second link in a same PPDU format, a same GI, and a same LTF type.

In some implementations, in synchronizing, process 1700 may involve processor 1612 receiving one or more response frames on the first link and the second link in a same PPDU format, a same GI, and a same LTF type.

In some implementations, in synchronizing the starting time and/or the ending time of the transmission and the reception on the first link and the second link, process 1700 may involve processor 1612 performing certain operations. For instance, process 1700 may involve processor 1612 maintaining a same duration for one or more pre-HE modulated fields over the first link and the second link. Additionally, process 1700 may involve processor 1612 maintaining a same duration for one or more HE modulated fields over the first link and the second link.

In some implementations, the one or more pre-HE modulated fields may include one or more of the following: a L-STF, a L-LTF, a L-SIG field, a RL-SIG field, a HE-SIG-A field and a HE-SIG-B field. In some implementations, the one or more HE modulated fields may include one or more of the following: a HE-STF, a HE-LTF and a data field.

In some implementations, in maintaining the same duration for the one or more HE modulated fields over the first link and the second link, process 1700 may involve processor 1612 transmitting one or more EOF padding subframes in an A-MPDU in one or more HE modulated fields of a HE SU PPDU transmitted on the first link and the second link or a HE MU PPDU transmitted on the first link and the second link.

In some implementations, in maintaining the same duration for the one or more pre-HE modulated fields over the first link and the second link, process 1700 may involve processor 1612 adding one or more Padding User fields in a User Specific field of a HE-SIG-B field.

FIG. 18 illustrates an example process 1800 in accordance with an implementation of the present disclosure. Process 1800 may represent an aspect of implementing various proposed designs, concepts, schemes, systems and methods described above. More specifically, process 1800 may represent an aspect of the proposed concepts and schemes pertaining to EHT synchronous and constrained multi-link transmissions in WLANs in accordance with the present disclosure. Process 1800 may include one or more operations, actions, or functions as illustrated by one or more of blocks 1810 and sub-blocks 1812, 1814 and 1816. Although illustrated as discrete blocks, various blocks of process 1800 may be divided into additional blocks, combined into fewer blocks, or eliminated, depending on the desired implementation. Moreover, the blocks/sub-blocks of process 1800 may be executed in the order shown in FIG. 18 or, alternatively in a different order. Furthermore, one or more of the blocks/sub-blocks of process 1800 may be executed repeatedly or iteratively. Process 1800 may be implemented by or in apparatus 1610 and apparatus 1620 as well as any variations thereof. Solely for illustrative purposes and without limiting the scope, process 1800 is described below in the context of apparatus 1610 as communication entity 110 (e.g., a STA or AP) and apparatus 1620 as communication entity 120 (e.g., a peer STA or AP) of a wireless network such as a WLAN in accordance with one or more of IEEE 802.11 standards. Process 1800 may begin at block 1810.

At 1810, process 1800 may involve processor 1612 of apparatus 1610 communicating with apparatus 1620 via a first link in a first frequency band and via a second link in a second frequency band different than the first frequency band by performing operations represented by 1812, 1814 and 1816.

At 1812, process 1800 may involve processor 1612 performing an independent EDCA on each of the first link and the second link. Process 1800 may proceed from 1812 to 1814.

At 1814, process 1800 may involve processor 1612 obtaining a TXOP. Process 1800 may proceed from 1814 to 1816.

At 1816, process 1800 may involve processor 1612 refraining from transmitting and receiving on the first link and the second link simultaneously to avoid causing an IDC interference.

In some implementations, in refraining from transmitting and receiving on the first link and the second link simultaneously, process 1800 may involve processor 1612 synchronizing a starting time and/or an ending time of transmissions on the first link and the second link within a predefined duration (e.g., aSIFSTime+aSignalExtension) by applying a MAC layer padding, a PHY layer padding, or a PE.

In some implementations, in synchronizing the starting time and/or the ending time of transmissions on the first link and the second link, process 1800 may involve processor 1612 synchronizing a first ending time of a first transmission on the first link and a second ending time of a second transmission on the second link to be within a shortened duration which is determined by subtracting a timing error margin from the predefined duration.

In some implementations, in synchronizing the starting time and/or the ending time of transmissions on the first link and the second link further, process 1800 may involve processor 1612 receiving, from apparatus 1620, information related to the timing error margin indicating that apparatus 1620 is able to respond within the predefined duration plus or minus the timing error margin from an end of a soliciting frame.

In some implementations, a difference between a first ending time of a first transmission on the first link and a second ending time of a second transmission on the second link may be less than a SIFS. In such cases, there may be no overlap between transmitting and receiving by the first apparatus. Alternatively, an overlap between transmitting and receiving by the first apparatus may be permissible when there is a SIFS timing accuracy error.

In some implementations, apparatus 1610 may function as an AP MLD, and apparatus 1620 may function as a non-STR non-AP MLD. In such cases, in synchronizing the starting time and/or the ending time of the transmission and the reception on the first link and the second link, process 1800 may involve processor 1612 aligning an ending time of a DL PPDU carrying a frame that solicits a response simultaneously sent to apparatus 1620 on the first link and the second link, with a difference between a first ending time of a first transmission on the first link and a second ending time of a second transmission on the second link being less than a certain duration (e.g., SIFS).

In some implementations, in communicating, process 1800 may further involve processor 1612 performing an early access of one other primary channel for which no TXOP is obtained for a respective EDCA for the other primary channel in an event that a physical CS and a virtual CS of the other primary channel are idle. In such cases, the physical CS may be checked during a PIFS.

In some implementations, in communicating, process 1800 may further involve processor 1612 either: (a) independently encoding each MPDU of a plurality of MPDUs into one of a plurality of frequency segments; or (b) jointly encoding the plurality of MPDUs into the plurality of frequency segments. In such cases, in independently encoding each MPDU of the plurality of MPDUs, process 1800 may involve processor 1612 using an independent DFT or an independent IDFT in independently encoding each MPDU of the plurality of MPDUs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a processor of a first apparatus, with a second apparatus via a first link in a first frequency band and via a second link in a second frequency band different than the first frequency band by performing operations comprising:
performing an independent enhanced distributed channel access (EDCA) on each of the first link and the second link;
obtaining a transmit opportunity (TXOP); and synchronizing either or both of a starting time and an ending time of a transmission and a reception on the first link and the second link, wherein a physical carrier sense (CS) is checked during a point coordination function (PCF) inter-frame space (PIFS), wherein the synchronizing of either or both of the starting time and the ending time of the transmission and the reception on the first link and the second link comprises:

calculating a first minimum transmission time of a response frame based on a transmit vector (TXVECTOR) parameter of a soliciting Physical Layer Conformance Procedure (PLCP) Protocol Data Unit (PPDU) on the first link;

calculating a second minimum transmission time of the response frame based on another TXVECTOR parameter of another soliciting PPDU on the second link;

determining either the first minimum transmission time or the second minimum transmission time, whichever is higher, to be a transmission time of the response frame;

applying a Medium Access Control (MAC) layer padding, a physical (PHY) layer padding, or both, on the first link and the second link in determining the transmission time; and transmitting the response frame at the transmission time on the first link and the second link.

2. The method of claim 1, wherein the synchronizing of either or both of the starting time and the ending time of the transmission and the reception on the first link and the second link further comprises synchronizing a start time of a transmission of one or more response frames on the first link and the second link at a short inter-frame space (SIFS) after reception of one or more soliciting frames.

3. The method of claim 1, wherein the communicating further comprises:

independently encoding each Medium Access Control (MAC) Protocol Data Unit (MPDU) of a plurality of MPDUs into one of a plurality of frequency segments; or jointly encoding the plurality of MPDUs into the plurality of frequency segments.

4. The method of claim 1, wherein the synchronizing comprises transmitting one or more frames on the first link and the second link in a same Physical Layer Conformance Procedure (PLCP) Protocol Data Unit (PPDU) format, a same guard interval (GI), and a same long training field (LTF) type.

5. The method of claim 1, wherein the synchronizing comprises receiving one or more response frames on the first link and the second link in a same Physical Layer Conformance Procedure (PLCP) Protocol Data Unit (PPDU) format, a same guard interval (GI), and a same long training field (LTF) type.

6. The method of claim 1, wherein the synchronizing of either or both of the starting time and the ending time of the transmission and the reception on the first link and the second link further comprises:

maintaining a same duration for one or more pre-high-efficiency (pre-HE) modulated fields over the first link and the second link; and maintaining a same duration for one or more high-efficiency (HE) modulated fields over the first link and the second link.

7. The method of claim 6, wherein the maintaining of the same duration for the one or more HE modulated fields over the first link and the second link comprises transmitting one or more end of frame (EOF) padding subframes in an aggregate Medium Access Control (MAC) Protocol Data Unit (A-MPDU) in one or more HE modulated fields of a HE single-user (SU) Physical Layer Conformance Procedure (PLCP) Protocol Data Unit (PPDU) transmitted on the first link and the second link or a HE multi-user (MU) PPDU transmitted on the first link and the second link.

8. The method of claim 6, wherein the maintaining of the same duration for the one or more pre-HE modulated fields over the first link and the second link comprises adding one or more Padding User fields in a User Specific field of a high-efficiency signal B field (HE-SIG-B).

9. A method, comprising:

communicating, by a processor of a first apparatus, with a second apparatus via a first link in a first frequency band and via a second link in a second frequency band different than the first frequency band by performing operations comprising:

performing an independent enhanced distributed channel access (EDCA) on each of the first link and the second link;

obtaining a transmit opportunity (TXOP); and refraining from either transmitting on the first link and receiving on the second link simultaneously or receiving on the first link and transmitting on the second link simultaneously, wherein the first apparatus functions as an access point (AP) multi-link device (MLD), wherein the second apparatus functions as a non-simultaneous-transmit-and-receive (NSTR) non-AP MLD, wherein a synchronizing of either or both of a starting time and an ending time of a transmission and a reception on the first link and the second link comprises aligning an ending time of a downlink (DL) Physical Layer Conformance Procedure (PLCP) Protocol Data Unit (PPDU) carrying a frame that solicits a response simultaneously sent to the second apparatus on the first link and the second link, and wherein a difference between a first ending time of a first transmission on the first link and a second ending time of a second transmission on the second link is less than a short inter-frame space (SIFS).

10. The method of claim 9, wherein the refraining from either transmitting on the first link and receiving on the second link simultaneously or receiving on the first link and transmitting on the second link simultaneously comprises synchronizing either or both of a starting time and an ending time of transmissions on the first link and the second link within a predefined duration by applying a Medium Access Control (MAC) layer padding, a physical (PHY) layer padding, or a packet extension (PE).

11. The method of claim 10, wherein the synchronizing of either or both of the starting time and the ending time of the transmissions on the first link and the second link comprises synchronizing a first ending time of a first transmission on the first link and a second ending time of a second transmission on the second link to be within a shortened duration which is determined by subtracting a timing error margin from the predefined duration.

12. The method of claim 11, wherein the synchronizing of either or both of the starting time and the ending time of the transmissions on the first link and the second link further comprises receiving, from the second apparatus, information related to the timing error margin indicating that the second apparatus is able to respond within the predefined duration plus or minus the timing error margin from an end of a soliciting frame.

13. The method of claim 10, wherein there is no overlap between transmitting and receiving by the first apparatus.

14. The method of claim 9, wherein the communicating further comprises:
   performing an early access of one other primary channel for which no TXOP is obtained for a respective EDCA for the other primary channel in an event that a physical carrier sense (CS) and a virtual CS of the other primary channel are idle; and
   performing:
      independently encoding each Medium Access Control (MAC) Protocol Data Unit (MPDU) of a plurality of MPDUs into one of a plurality of frequency segments; or
      jointly encoding the plurality of MPDUs into the plurality of frequency segments,
   wherein the physical CS is checked during a point coordination function (PCF) inter-frame space (PIFS), and
   wherein the independently encoding of each MPDU of the plurality of MPDUs comprises using an independent discrete Fourier transform (DFT) or an independent inverse discrete Fourier transform (IDFT) in independently encoding each MPDU of the plurality of MPDUs.

15. An apparatus as a first apparatus, comprising:
   a transceiver configured to communicate wirelessly; and
   a processor coupled to the transceiver and configured to perform operations comprising:
      communicating, via the transceiver, with a second apparatus via a first link in a first frequency band and via a second link in a second frequency band different than the first frequency band by performing operations comprising:
         performing an independent enhanced distributed channel access (EDCA) on each of the first link and the second link;
         obtaining a transmit opportunity (TXOP); and
         synchronizing either or both of a starting time and an ending time of a transmission and a reception on the first link and the second link,
      wherein a physical carrier sense (CSI is checked during a point coordination function (PCF) inter-frame space (PIFS),
      wherein the synchronizing of either or both of the starting time and the ending time of the transmission and the reception on the first link and the second link comprises:
         calculating a first minimum transmission time of a response frame based on a transmit vector (TXVECTOR) parameter of a soliciting Physical Layer Conformance Procedure (PLCP) Protocol Data Unit (PPDU) on the first link;
         calculating a second minimum transmission time of the response frame based on another TXVECTOR parameter of another soliciting PPDU on the second link;
         determining either the first minimum transmission time or the second minimum transmission time, whichever is higher, to be a transmission time of the response frame;
         applying a Medium Access Control (MAC) layer padding, a physical (PHY) layer padding, or both, on the first link and the second link in determining the transmission time; and
         transmitting the response frame at the transmission time on the first link and the second link.

16. The apparatus of claim 15, wherein the synchronizing comprises transmitting one or more frames on the first link and the second link in a same Physical Layer Conformance Procedure (PLCP) Protocol Data Unit (PPDU) format, a same guard interval (GI), and a same long training field (LTF) type.

* * * * *